United States Patent
Morimoto et al.

(10) Patent No.: US 12,368,363 B2
(45) Date of Patent: Jul. 22, 2025

(54) MAGNETIC-GEARED MOTOR AND MAGNETIC GEAR

(71) Applicant: Panasonic Intellectual Property Management Co., Ltd., Osaka (JP)

(72) Inventors: Eiki Morimoto, Osaka (JP); Kiyomi Kawamura, Osaka (JP); Yasuaki Matsushita, Kyoto (JP); Noritaka Aso, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 237 days.

(21) Appl. No.: 18/249,731

(22) PCT Filed: Nov. 4, 2021

(86) PCT No.: PCT/JP2021/040490
§ 371 (c)(1),
(2) Date: Apr. 19, 2023

(87) PCT Pub. No.: WO2022/118598
PCT Pub. Date: Jun. 9, 2022

(65) Prior Publication Data
US 2023/0387775 A1 Nov. 30, 2023

(30) Foreign Application Priority Data

Dec. 2, 2020 (JP) .................................. 2020-200284

(51) Int. Cl.
*H02K 49/10* (2006.01)
(52) U.S. Cl.
CPC .................................. *H02K 49/102* (2013.01)
(58) Field of Classification Search
CPC ........ F16H 49/005; H02K 1/30; H02K 15/12; H02K 49/102; H02K 7/11
See application file for complete search history.

(56) References Cited

U.S. PATENT DOCUMENTS

| | | | | |
|---|---|---|---|---|
| 7,481,283 B2* | 1/2009 | McDonald | ............ | F16H 49/005 |
| | | | | 166/66.5 |
| 7,932,657 B2* | 4/2011 | Bando | .................... | H02K 1/276 |
| | | | | 310/156.16 |

(Continued)

FOREIGN PATENT DOCUMENTS

| | | |
|---|---|---|
| DE | 2405678 A1 | 8/1975 |
| EP | 3118972 | 1/2017 |

(Continued)

OTHER PUBLICATIONS

The EPC Office Action dated May 23, 2024 for the related European Patent Application No. 21900353.0.

(Continued)

*Primary Examiner* — Leda T Pham
(74) *Attorney, Agent, or Firm* — Rimon P.C.

(57) ABSTRACT

Provided is a magnetic geared motor and a magnetic gear that support pole pieces with high rigidity, have small residual stress, and are very easy to assemble. Included are stator, first rotor that rotates by magnetic flux generated by stator, and second rotor that rotates at a speed different from that of first rotor. Second rotor includes a plurality of pole pieces annularly arranged along the circumferential direction of second rotor, and frame including a circumferential portion including a plurality of gaps respectively corresponding to the plurality of pole pieces and in each of which the corresponding one of the plurality of pole pieces is at least partly inserted. The plurality of pole pieces and frame are integrated with mold resin.

20 Claims, 24 Drawing Sheets

(56) References Cited

U.S. PATENT DOCUMENTS

| | | | |
|---|---|---|---|
| 9,425,655 B2 | 8/2016 | Calverley et al. | |
| 2008/0169719 A1* | 7/2008 | Yu | H02K 1/17 310/156.08 |
| 2008/0296997 A1 | 12/2008 | Bando et al. | |
| 2011/0012458 A1* | 1/2011 | Atallah | H02K 51/00 310/103 |
| 2012/0194021 A1 | 8/2012 | Nakatsugawa et al. | |
| 2019/0028015 A1 | 1/2019 | Powell et al. | |
| 2021/0226523 A1 | 7/2021 | Powell et al. | |
| 2022/0052596 A1 | 2/2022 | Ukaji et al. | |

FOREIGN PATENT DOCUMENTS

| | | |
|---|---|---|
| GB | 2549447 | 10/2017 |
| JP | 4859751 B2 | 1/2012 |
| JP | 2012-157205 | 8/2012 |
| JP | 2013-106401 | 5/2013 |
| JP | 2014-015991 A | 1/2014 |
| WO | 2015/137392 | 9/2015 |
| WO | 2017/121987 | 7/2017 |
| WO | 2020/174936 | 9/2020 |

OTHER PUBLICATIONS

International Search Report of PCT application No. PCT/JP2021/040490 dated Jan. 25, 2022.

\* cited by examiner

MAGNETIC-GEARED MOTOR AND MAGNETIC GEAR

TECHNICAL FIELD

The present disclosure relates to a magnetic geared motor and a magnetic gear.

BACKGROUND ART

In recent years, automatic guided vehicles (AGVs) have been increasingly used in factories, warehouses, and the like. The AGV is driven by, for example, a motor. The motor for driving the AVG is required to have characteristics of high torque at low speed and high efficiency for travelling long-distance. In this regard, it has been studied to use a non-contact and high-torque magnetic geared motor as a motor for driving an AGV.

The magnetic geared motor is a motor using a magnetic gear (magnetic reduction gear) using harmonic magnetic flux. The magnetic geared motor includes, for example, a stator, a high-speed rotor, and a low-speed rotor (for example, Patent Literature 1). In such a magnetic geared motor, harmonic magnetic flux is generated by rotating a high-speed rotor by a magnetomotive force of a stator. This enables rotating the low-speed rotor having an output shaft with a predetermined gear ratio (reduction ratio).

CITATION LIST

Patent Literature

PTL 1: Unexamined Japanese Patent Publication No. 2013-106401

PTL 2: WO 2015/137392 A

SUMMARY OF THE INVENTION

A magnetic gear and a magnetic geared motor include a rotor. The rotor includes a plurality of pole pieces annularly arranged over the entire circumference in a rotation direction. For example, a magnetic geared motor disclosed in Patent Literature 1 includes a low-speed rotor as a rotor including a plurality of pole pieces.

In the magnetic gear and the magnetic geared motor, a plurality of pole pieces generates torque and force such as radial force, so that a plurality of pole pieces needs to be supported with high rigidity. Therefore, as a way of supporting a plurality of annularly arranged pole pieces with high rigidity, the following way has been proposed. Proposed is a way in which, as in rotor 30X illustrated in FIG. 28, metal rod 900X such as a bolt is disposed between two adjacent pole pieces 100X. Furthermore, as disclosed in Patent Literature 2, such a way is proposed that a metal rod such as a bolt is inserted into a through-hole provided in each pole piece.

In the way of supporting a pole piece by a metal rod, a plurality of metal rods is annularly arranged. A plurality of metal rods is sandwiched to be fixed by, for example, two brackets located on both end sides, regarding the longitudinal direction, of the metal rod. Specifically, one end of each metal rod is inserted into an insertion hole of one bracket, and the other end of each metal rod is inserted into an insertion hole of the other bracket. Nuts are attached to the ends of each metal rod protruding to outer sides of the insertion holes of the brackets, and both ends of the metal rods are tightened with the nuts. A plurality of metal rods can thereby be fixed via the brackets.

In the way of supporting the pole pieces by the metal rods as described above, the metal rods can receive the torque and force such as radial force generated by the rotating rotor and acting on the pole pieces, and thus a plurality of pole pieces can be supported with high rigidity.

However, to support the pole pieces by the metal rods, two ends of each of a plurality of metal rods are fixed to the brackets by nuts or the like, so that simultaneous contact at multiple points occurs. This requires accuracy for the metal rods and insertion holes of the brackets, which increases the man-hour of assembling and makes assembling difficult. Furthermore, this makes it difficult to ensure reliability and mass productivity.

Furthermore, in the way of supporting the pole pieces by the metal rods, strain is produced in the pole pieces, the metal rods, the brackets, or the like due to accuracy in processing a plurality of insertion holes of the brackets, fastening force of a plurality of nuts, or the like, which causes residual stress in the rotor. Alternatively, when the insertion holes of the brackets are made large to suppress residual stress, the pole pieces cannot be supported with high rigidity.

Accordingly, use of metal rods enables supporting pole pieces with high rigidity, but this requires using a plurality of screws and nuts, which makes assembling difficult and/or produces residual stress. The same can be said when metals are fitted to each other without using screws or nuts, such as when a metal rod is press-fitted into a hole of a bracket.

As described above, conventional rotors having pole pieces need to accept any one of low rigidity, difficulty in assembling, and residual stress.

The present disclosure has been made to solve such a problem. An object of the present disclosure is to provide a magnetic geared motor and a magnetic gear that support pole pieces with high rigidity, have small residual stress, and are very easy to assemble.

To solve the above-described problem, one aspect of a magnetic geared motor according to the present disclosure includes a stator, a first rotor, and a second rotor. The first rotor includes a first rotary shaft. The first rotor rotates about the axis of the first rotary shaft by magnetic flux generated by the stator. The second rotor includes a second rotary shaft, a plurality of pole pieces, a frame, and a mold resin. The second rotary shaft is coaxial with the first rotary shaft. The second rotor rotates about the axis of the second rotary shaft. The plurality of pole pieces is annularly arranged along the circumferential direction of the second rotor. The frame includes a circumferential portion. A plurality of gaps is formed in the circumferential portion. One of the plurality of gaps is arranged to correspond to one of the plurality of pole pieces. Each of the plurality of pole pieces is disposed at least partly in the corresponding gap among the plurality of gaps. The plurality of pole pieces and the frame are integrated with mold resin. The second rotor rotates at an angular velocity different from the angular velocity of the first rotor.

Another aspect of a magnetic geared motor according to the present disclosure includes a stator, a first rotor, and a second rotor that rotates at a speed different from the speed of the first rotor. The first rotor includes a first rotary shaft. The first rotor rotates about the axis of first rotary shaft by magnetic flux generated by the stator. The second rotor includes a second rotary shaft. The first rotary shaft and the second rotary shaft are coaxial with each other. The second rotor rotates about the axis of the second rotary shaft. The stator includes a plurality of pole pieces, a frame, and a mold resin. The plurality of pole pieces is annularly arranged along the circumferential direction of the second rotor. The frame includes a circumferential portion. A plurality of gaps is formed in the circumferential portion. One of the plurality of gaps is arranged to correspond to one of the plurality of pole pieces. Each of the plurality of pole pieces is disposed at least partly in the corresponding gap among the plurality of gaps. The plurality of pole pieces and the frame are integrally formed with the mold resin. The first rotor and the second rotor rotate at different angular velocities.

One aspect of a magnetic gear according to the present disclosure is a magnetic gear including a rotor. The rotor includes a plurality of pole pieces, a frame, and a mold resin. A plurality of pole pieces is annularly arranged along the circumferential direction of the rotor. The frame includes a circumferential portion. A plurality of gaps is formed in the circumferential portion. One of the plurality of gaps is arranged to correspond to one of the plurality of pole pieces. Each of the plurality of pole pieces is disposed at least partly in the corresponding gap among the plurality of gaps. The plurality of pole pieces and the frame are integrally formed with the mold resin.

Another aspect of a magnetic gear according to the present disclosure is a magnetic gear including a stator. The stator includes a plurality of pole pieces, a frame, and a mold resin. A plurality of pole pieces is annularly arranged along the circumferential direction of the stator. The frame includes a circumferential portion. A plurality of gaps is formed in the circumferential portion. One of the plurality of gaps is arranged to correspond to one of the plurality of pole pieces. Each of the plurality of pole pieces is disposed at least partly in the corresponding gap among the plurality of gaps. The plurality of pole pieces and the frame are integrally formed with the mold resin.

According to the present invention, a magnetic geared motor and a magnetic gear that can support pole pieces with high rigidity, have small residual stress, and are very easy to assemble can be provided.

DESCRIPTION OF EMBODIMENT

Exemplary embodiments of the present disclosure will now be described. Note that, each of the exemplary embodiments described below illustrates one specific example of the present disclosure. Therefore, numerical values, component elements, locations and modes of connection of the component elements, and the like described in the following exemplary embodiments are merely examples, and are not intended to limit the present disclosure. Thus, among the component elements in the following exemplary embodiments, a component element that is not described in an independent claim indicating the broadest concept of the present disclosure is described as an optional component element.

Furthermore, each of the drawings is a schematic view, and is not necessarily precisely illustrated. Note that, in each of the drawings, substantially the same configurations are denoted by the same reference marks to eliminate or simplify duplicated description.

EXEMPLARY EMBODIMENT

Figure 1:
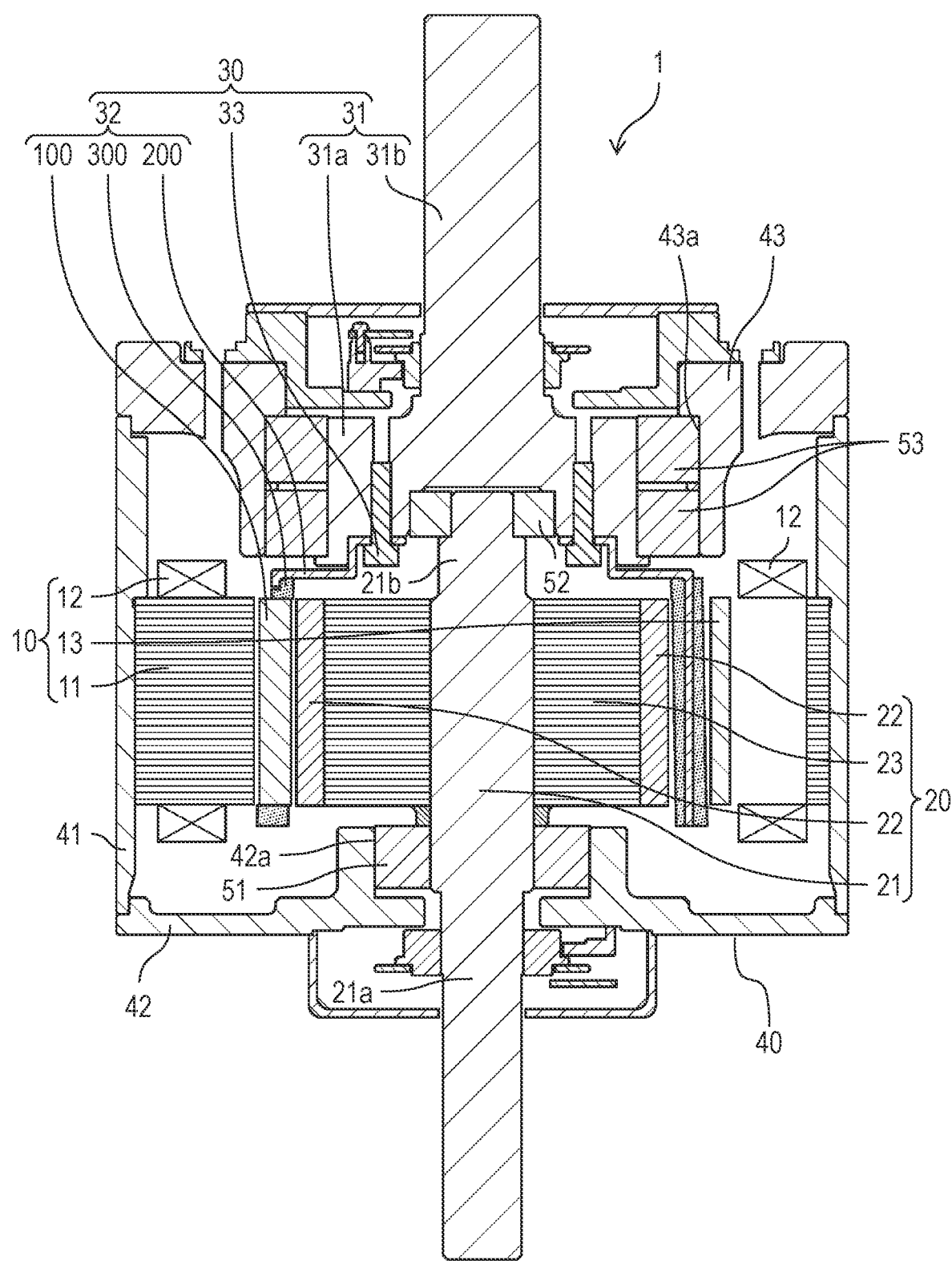
FIG. 1 is a cross-sectional view of a magnetic geared motor according to an exemplary embodiment.
Figure 2:
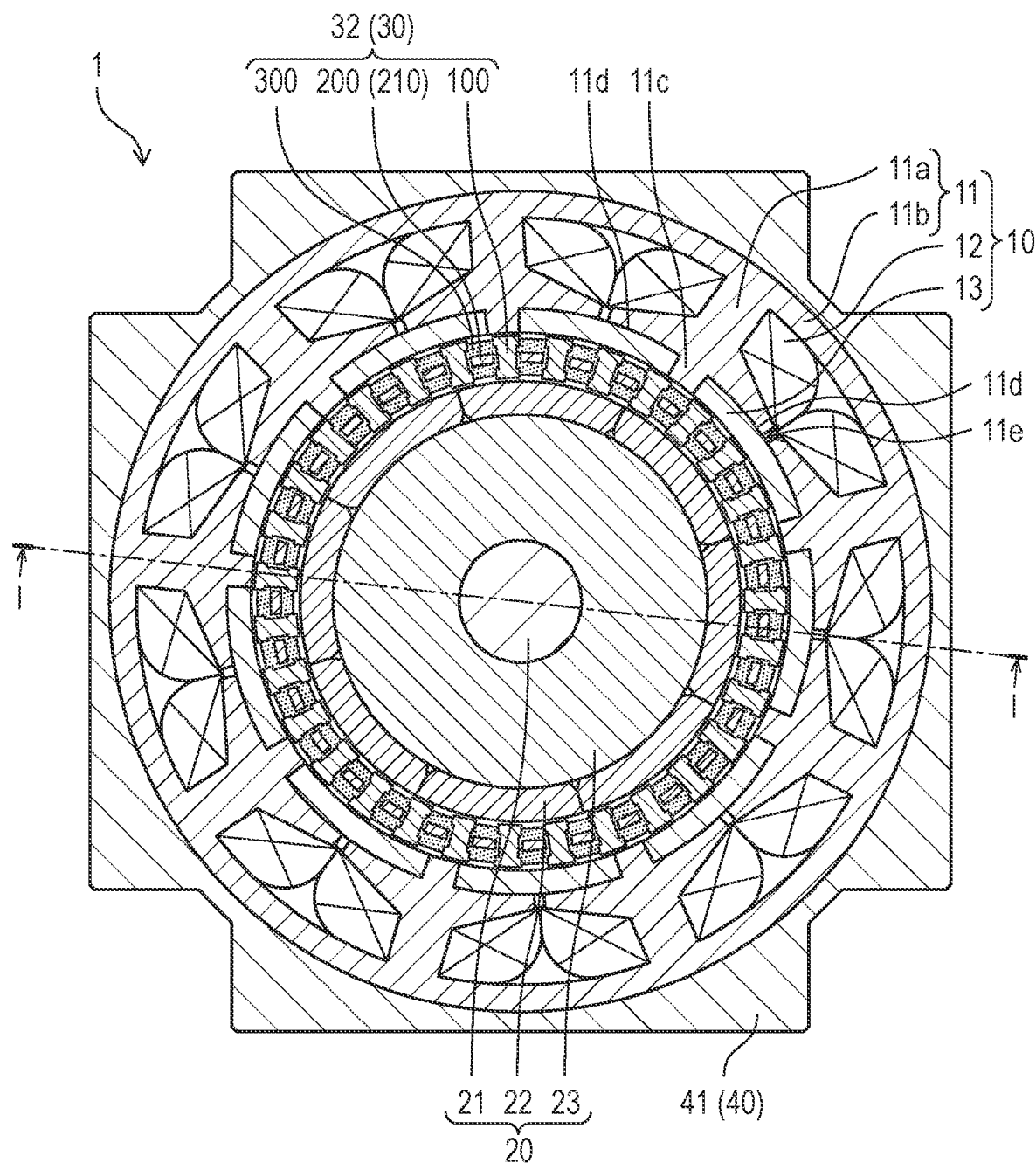
FIG. 2 is a cross-sectional view of the magnetic geared motor according to the exemplary embodiment.

First, a general configuration of magnetic geared motor 1 according to an exemplary embodiment will be described with reference to FIGS. 1 and 2. FIGS. 1 and 2 are cross-sectional views of magnetic geared motor 1 according to the exemplary embodiment. FIG. 1 is a cross-sectional view taken along line I-I in FIG. 2, illustrating a cross section taken along the axis of first rotary shaft 21. FIG. 2 illustrates a cross section on a plane normal to the axis of first rotary shaft 21. FIGS. 1 and 2 each illustrate a portion appearing in the cross section.

Magnetic geared motor 1 is a motor including therein a magnetic gear. As illustrated in FIGS. 1 and 2, magnetic geared motor 1 includes stator (stator) 10, first rotor (first rotor) 20 that rotates by magnetic flux generated by stator 10, and second rotor (second rotor) 30 that rotates at a speed different from the speed of first rotor 20. In the present exemplary embodiment, first rotor 20 is a high-speed rotor that rotates at a higher speed than second rotor 30, and second rotor 30 is a low-speed rotor that rotates at a lower speed than first rotor 20. Magnetic geared motor 1 further includes housing 40, first bearing 51, second bearing 52, and third bearings 53.

As illustrated in FIG. 2, magnetic geared motor 1 of the present exemplary embodiment is an inner rotor motor in which first rotor 20 and second rotor 30 are disposed inside stator 10. That is, stator 10 is disposed so as to surround first rotor 20 and second rotor 30.

First rotor 20 includes first rotary shaft 21 and rotates about the axis of first rotary shaft 21. Second rotor 30 includes second rotary shaft 31 and rotates about the axis of second rotary shaft 31. In magnetic geared motor 1 according to the present exemplary embodiment, second rotary shaft 31 of second rotor 30 is an output shaft.

First rotary shaft 21 of first rotor 20 is a rod-shaped shaft. Second rotary shaft 31 of second rotor 30 is a shaft including bottomed cylinder 31a and rod 31b. In second rotary shaft 31, rod 31b is connected to the back surface of the bottom of bottomed cylinder 31a. First rotary shaft 21 and second rotary shaft 31 are made of, for example, a metal material.

Since second rotary shaft 31 of second rotor 30 is an output shaft, rod 31b of second rotary shaft 31 is exposed outside housing 40. Bottomed cylinder 31a of second rotary shaft 31 is inside housing 40.

Stator 10, first rotor 20, and second rotor 30 are coaxially disposed. That is, the center of stator 10, the axis of first rotary shaft 21 of first rotor 20, and the axis of second rotary shaft 31 of second rotor 30 match each other. Therefore, the axis of rotation of first rotor 20 and second rotor 30 match each other.

Stator 10 faces first rotor 20 and second rotor 30. As illustrated in FIG. 2, in the present exemplary embodiment, stator 10, second rotor 30, and first rotor 20 are disposed in this order from the outer side toward the inner side regarding a radial direction. That is, second rotor 30 is disposed between stator 10 and first rotor 20. The term "radial direction" is defined as follows. In a plane of which normal line is a straight line on which the axis of first rotary shaft 21 of first rotor 20 exists, a direction from a point corresponding to the axis of first rotary shaft 21 toward the outside of first rotary shaft 21 is defined as "radial direction". For example, in FIG. 2, the direction from the center of first rotor 20 (the axis of first rotary shaft 21) toward the outside of first rotor 20 is the radial direction. According to this definition, "from the outer side toward the inner side regarding the radial direction" means from the outer side of first rotor 20 toward the center of first rotor 20 in FIG. 2. A term "radially inner side direction" is a direction from the outside of first rotor 20 toward the center of first rotor 20 in FIG. 2, and a term "radially outer side direction" is a direction opposite to the "radially inner side direction".

Stator 10 generates magnetic force that acts on first rotor 20 and second rotor 30. Specifically, stator 10 is configured such that N poles and S poles alternately appear along the circumferential direction on an air gap surface facing second rotor 30. The term "circumferential direction" is defined as follows. In a plane of which normal line is a straight line on which the axis of first rotary shaft 21 of first rotor 20 exists, a direction along the circumference of a circle centered on a point corresponding to the axis of first rotary shaft 21 is defined as "circumferential direction". The "circumferential direction" of the "air gap surface" is a direction along the circumference of a circle representing the inner surface of stator 10 in FIG. 2.

Stator 10 of the present exemplary embodiment includes stator core 11 including a plurality of teeth 11a and yoke 11b, coil 12 wound around each of the plurality of teeth 11a, and permanent magnets 13.

Stator core 11 is a stator core serving as a core of stator 10, and generates magnetic force for rotating first rotor 20 and second rotor 30. For example, stator core 11 is a stacked body in which a plurality of magnetic steel sheets is stacked along the axis of first rotary shaft 21 of first rotor 20. Note that, stator core 11 is not limited to a stacked body of a plurality of steel sheets, and may be a bulk body formed of a magnetic material.

As illustrated in FIG. 2, the plurality of teeth 11a provided in stator core 11 is annularly provided at a constant interval along the rotation direction (circumferential direction) along which first rotor 20 and second rotor 30 rotate. That is, the plurality of teeth 11a is arranged at a constant interval along the circumferential direction of a circle centered on the axis of first rotary shaft 21 of first rotor 20. Specifically, the plurality of teeth 11a radially extends in a direction (radial direction) orthogonal to the axis of the first rotary shaft 21 from the axis of stator 10 (that is, first rotary shaft 21).

The plurality of teeth 11a faces second rotor 30. In the present exemplary embodiment, each of the plurality of teeth 11a faces pole piece assembly 32 of second rotor 30. The plurality of teeth 11a is formed on the inner side of yoke 11b. Specifically, the plurality of teeth 11a extends so as to protrude in the radially inner side direction from annular yoke 11b. Yoke 11b is a back yoke formed on the outer side of the plurality of teeth 11a. Yoke 11b is formed in an annular shape along the circumferential direction of a circle centered on the axis of first rotary shaft 21. In the present exemplary embodiment, teeth 11a and yoke 11b are integrally configured as stator core 11. That is, a single steel sheet constituting stator core 11 has a portion corresponding to teeth 11a and a portion corresponding to yoke 11b.

Each of teeth 11a is a magnetic pole tooth, and is an electromagnet that generates magnetic force by energization of coil 12 wound around tooth 11a. Coil 12 is a winding coil which is an armature winding of stator 10, and is wound in such a manner that a current flowing in coil 12 generates magnetic flux that acts on first rotor 20. In the present exemplary embodiment, coil 12 is a concentrated winding coil wound around each of the plurality of teeth 11a. Coil 12 is configured as a three-phase winding so that first rotor 20 can rotate to serve as a three-phase synchronous motor. Coil 12 may be wound around teeth 11a via an insulator (not illustrated).

Between two adjacent teeth 11a, a slot in which coil 12 is disposed is formed. That is, the slot of stator 10 corresponds to a gap between the two adjacent teeth 11a. As illustrated in FIG. 2, since stator 10 of the present exemplary embodiment has nine teeth 11a, the number of slots of stator 10 is nine.

Each of a plurality of teeth 11a has a magnetic pole portion 11c protruding in the radial direction. A recess 11d is provided at each of two ends, in the circumferential direction, at the leading end of each of teeth 11a. That is, each of teeth 11a is provided with two recesses 11d. With two recesses 11d provided in each of teeth 11a, magnetic pole portion 11c has a projecting shape.

Between two adjacent teeth 11a, slot opening 11e exists. Slot opening 11e is a gap existing between leading ends of two adjacent teeth 11a.

Permanent magnet 13 is disposed as a stator magnet at each slot opening 11e. Therefore, a plurality of permanent magnets 13 is disposed in stator 10. At each slot opening 11e, permanent magnet 13 is disposed across two adjacent teeth 11a so as to close slot opening 11e. That is, a single permanent magnet 13 is disposed in recess 11d of one of the two adjacent teeth 11a and recess 11d of the other. Specifically, a single permanent magnet 13 is held by two adjacent teeth 11a by being sandwiched by magnetic pole portion 11c of one of the adjacent teeth 11a and magnetic pole portion 11c of the other. Permanent magnet 13 is magnetized to have a magnetic pole direction in the radial direction of stator Permanent magnet 13 is, for example, a sintered magnet.

Magnetic pole portion 11c and permanent magnet 13 face pole piece assembly 32 of second rotor 30. Leading end surfaces of magnetic pole portions 11c and surfaces of permanent magnets 13 form an air gap surface of stator 10. In the present exemplary embodiment, the leading end surfaces of magnetic pole portions 11c and surfaces of permanent magnets 13 are flush with each other to form a continuous air gap surface. Note that, magnetic pole portions 11c and permanent magnets 13 are continuously provided with no gap therebetween over the entire circumference of stator 10.

Magnetic pole portions 11c and permanent magnets 13 are arranged such that N poles and S poles alternately appear on the air gap surface. In the present exemplary embodiment, permanent magnets 13 are magnetized so as to have 5 poles, and the number of pole pairs is 27.

First rotor 20, which is a high-speed rotor, has a plurality of magnetic pole pairs. In the present exemplary embodiment, first rotor 20 is a permanent magnet rotor, and has a plurality of permanent magnets 22 as a plurality of magnetic pole pairs as illustrated in FIG. 2.

The plurality of permanent magnets 22 is magnetized to have a magnetic pole direction in the radial direction of first rotor 20, and is arranged such that N poles and S poles alternately and evenly exist along the circumferential direction of first rotary shaft 21. As an example, permanent magnet 22 is a sintered magnet. In the present exemplary embodiment, eight permanent magnets 22 are arranged. Therefore, the number of pole pairs of first rotor 20 is 4. That is, the number of poles of first rotor 20 is 8.

As illustrated in FIGS. 1 and 2, first rotor 20 includes rotor core 23. Rotor core 23 is a rotor iron core serving as a core of first rotor 20, and is, for example, a stacked body in which a plurality of magnetic steel sheets is stacked along the axis of first rotary shaft 21. Note that, rotor core 23 is not limited to the stacked body of magnetic steel sheets, but may be a bulk body made of a magnetic material.

The plurality of permanent magnets 22 is provided in rotor core 23. In the present exemplary embodiment, since first rotor 20 is a surface permanent magnet (SPM) rotor, the plurality of permanent magnets 22 is provided on the outer circumferential surface of rotor core 23. Specifically, as illustrated in FIG. 2, the plurality of permanent magnets 22 is continuously arranged in the circumferential direction so as to cover the entire outer circumferential surface of rotor core 23. Therefore, the plurality of permanent magnets 22 faces pole piece assembly 32 of second rotor 30. Thus, the surface of each permanent magnet 22 is an outer surface of first rotor 20 and serves as an air gap surface.

In first rotor 20, first rotary shaft 21 is fixed to rotor core 23. Specifically, as illustrated in FIG. 1, first rotary shaft 21 penetrates rotor core 23 so as to protrude on both sides of rotor core 23 and is fixed to rotor core 23. For example, first rotary shaft 21 is inserted into a through-hole provided through the center of rotor core 23 and fixed to rotor core 23. In this case, first rotary shaft 21 is fixed to rotor core 23 by, for example, press-fitting or shrink-fitting first rotary shaft 21 into the through-hole of rotor core 23.

As illustrated in FIGS. 1 and 2, second rotor 30, which is a low-speed rotor, includes second rotary shaft 31 and pole piece assembly 32 which is a rotor body.

Pole piece assembly 32 includes a plurality of pole pieces (magnetic pole pieces) 100. Each of a plurality of pole pieces 100 is magnetic flux concentration means made of a magnetic material. As illustrated in FIG. 2, in the present exemplary embodiment, second rotor 30 includes 31 pole pieces 100. Therefore, the number of pole pairs of second rotor is 31.

The plurality of pole pieces 100 faces permanent magnets 22 of first rotor 20. The plurality of pole pieces 100 faces teeth 11a and the plurality of permanent magnets 13 of stator 10. In the present exemplary embodiment, a first surface on the side to first rotor 20 (radially inner-side surface) and a second surface on the side to stator 10 (radially outer-side surface) of each of the plurality of pole pieces 100 are exposed to form an air gap surface.

The detailed structure of second rotor 30 will be described later.

First rotor 20 and second rotor 30 are coaxially rotatable, independent of each other. Specifically, as illustrated in FIG. 1, first rotor 20 and second rotor 30 are rotatably supported by first bearing 51, second bearing 52, and third bearings 53 to be independently rotatable.

In the present exemplary embodiment, first rotor 20 is rotatably supported by first bearing 51 and second bearing 52. Specifically, first bearing 51 supports first end 21a that is one end of first rotary shaft 21, and second bearing 52 supports second end 21b that is the other end of first rotary shaft 21.

Second rotor 30 is rotatably supported by third bearings 53. Specifically, third bearings 53 support an outer surface of bottomed cylinder 31a of second rotary shaft 31.

First bearing 51, second bearing 52, and third bearings 53 are, for example, ball bearings, but are not limited thereto as long as they can rotatably support first rotary shaft 21 and second rotary shaft 31. Note that, third bearings 53 constitute a double bearing in which two bearings are disposed along the axis of second rotary shaft 31, but are not limited thereto.

As illustrated in FIG. 1, stator 10, first rotor 20, and second rotor 30 are housed in housing 40. Housing 40 is a case for housing stator 10, first rotor 20, and second rotor 30, and constitutes an outer shell of magnetic geared motor 1. In the present exemplary embodiment, housing 40 includes a plurality of components. Specifically, housing 40 includes sleeve 41 having a sleeve-shape, first bracket 42, and second bracket 43.

First bracket 42 is disposed so as to close the opening on one side of sleeve 41. First bearing 51 is fixed to first bracket 42. Specifically, first bracket 42 is provided with first bearing holder 42a for holding first bearing 51.

Second bracket 43 is disposed so as to close the opening on the other side of sleeve 41. Third bearings 53 are fixed to second bracket 43. Specifically, second bracket 43 is provided with third bearing holder 43a for holding third bearings 53.

Sleeve 41, first bracket 42, and second bracket 43 are made of, for example, a metal material, but may be made of a resin material. Sleeve 41, first bracket 42, and second bracket 43 may be made of the same material or different materials.

Magnetic geared motor 1 configured as described above is a permanent magnet synchronous motor and is driven by an inverter. Specifically, by energizing coil 12 of stator 10 by an alternating current from the inverter, a field current flows in coil 12, and magnetic flux corresponding to a current-control phase is generated by stator 10 (teeth 11a). The magnetic force generated by interaction between the magnetic flux generated by stator 10 and the magnetic flux generated by permanent magnets 22 of first rotor 20 produces a torque for rotating first rotor 20, and first rotor 20 rotates. The magnetic flux generated by first rotor 20 is modulated by pole pieces 100 of second rotor 30, and harmonic magnetic flux is generated between second rotor 30 and stator 10. The magnetic flux generated by stator 10 decelerates second rotor 30 by a predetermined gear ratio (reduction ratio) and rotates with high torque.

Figure 3:
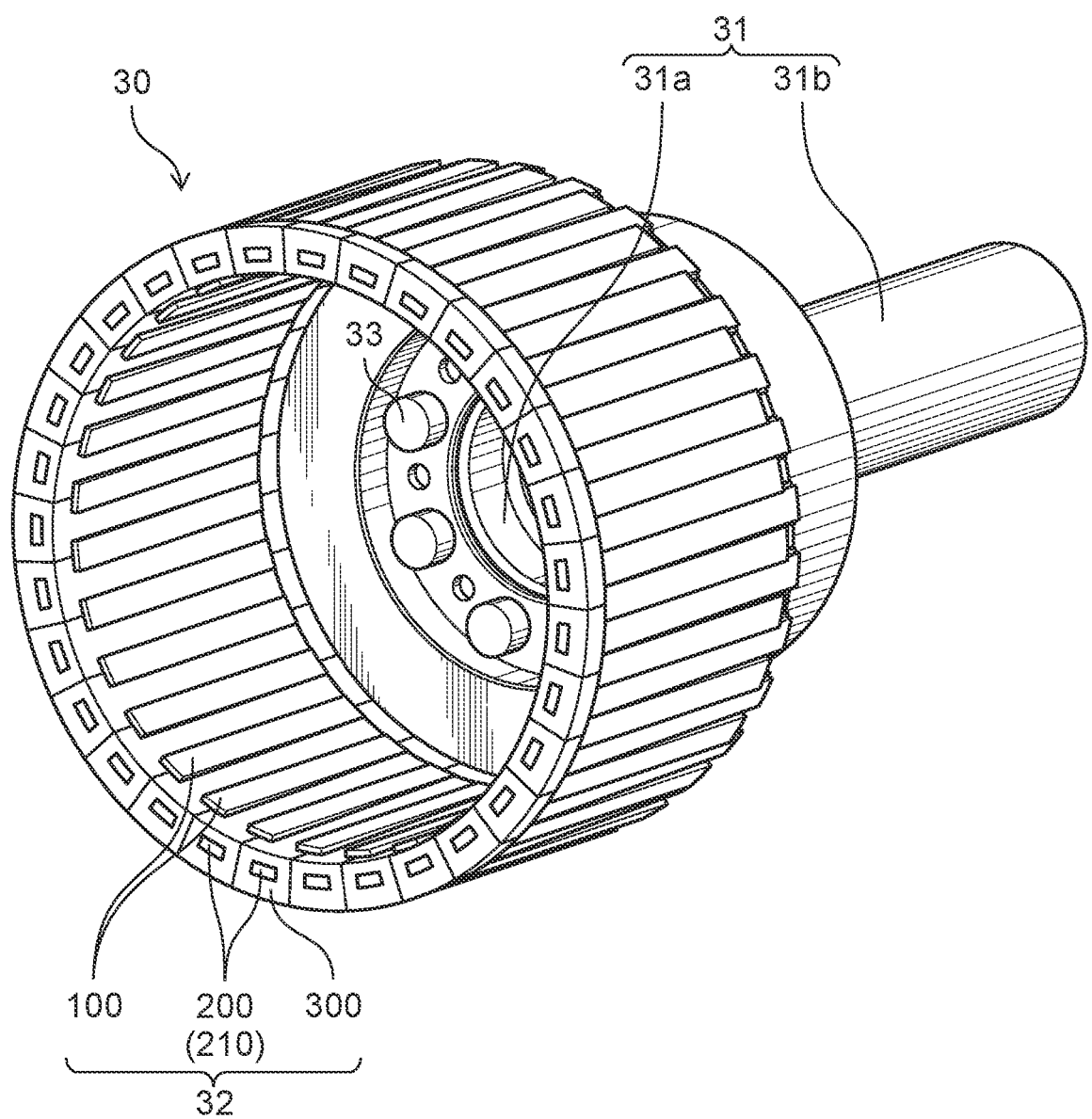
FIG. 3 is an external perspective view of a second rotor of the magnetic geared motor according to the exemplary embodiment.
Figure 4:
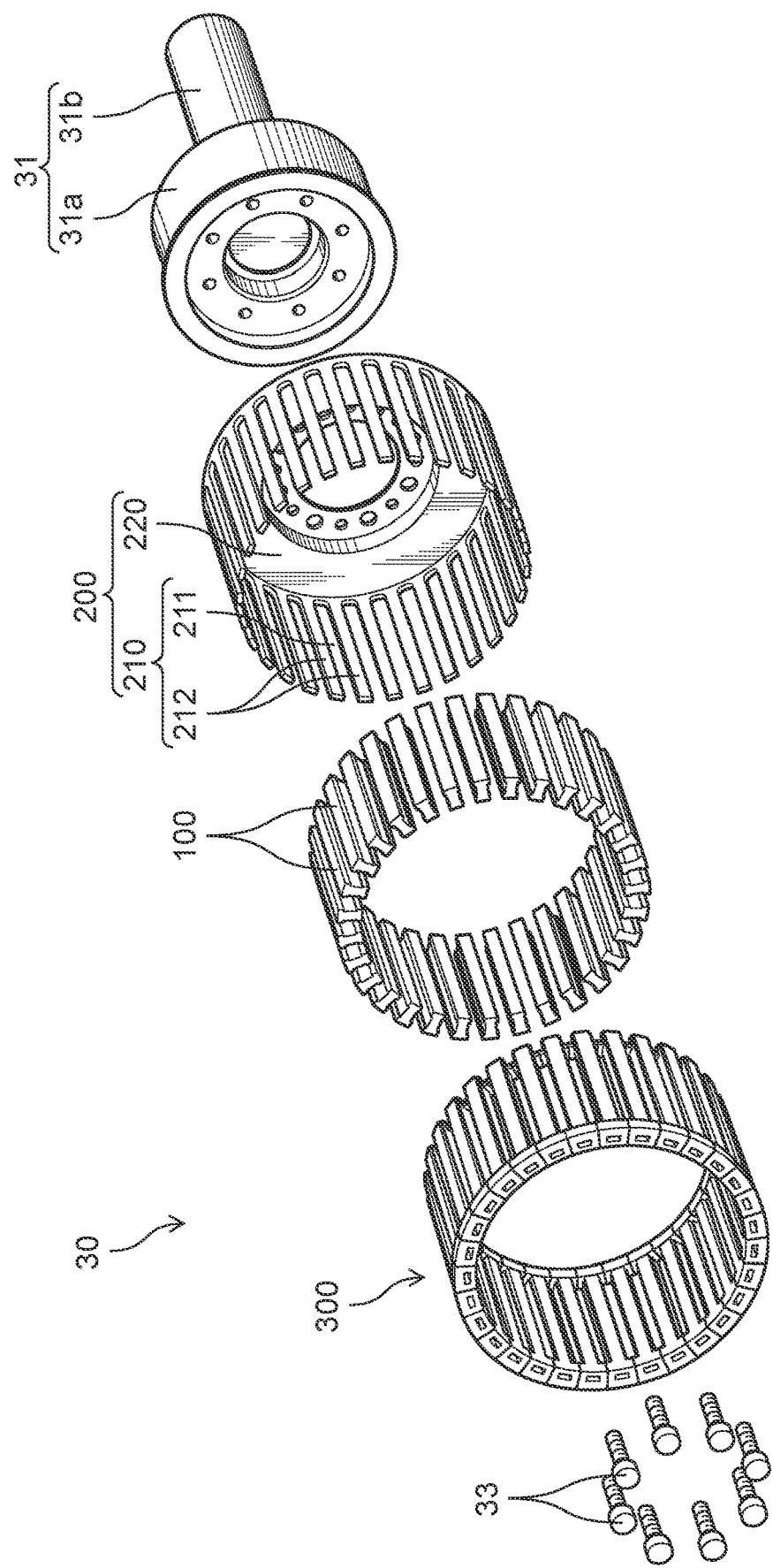
FIG. 4 is an exploded perspective view of the second rotor of the magnetic geared motor according to the exemplary embodiment.
Figure 5:
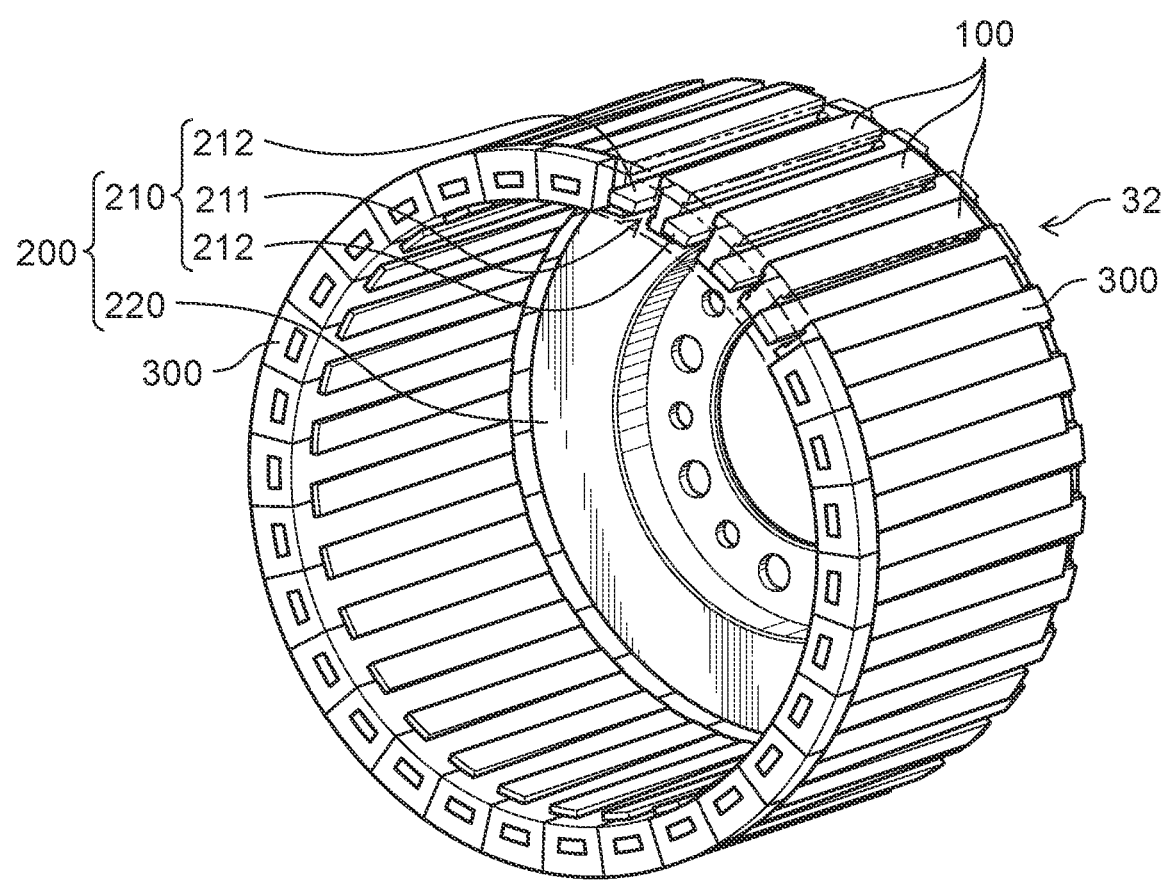
FIG. 5 is a perspective view of a pole piece assembly of the second rotor according to the exemplary embodiment.
Figure 6:
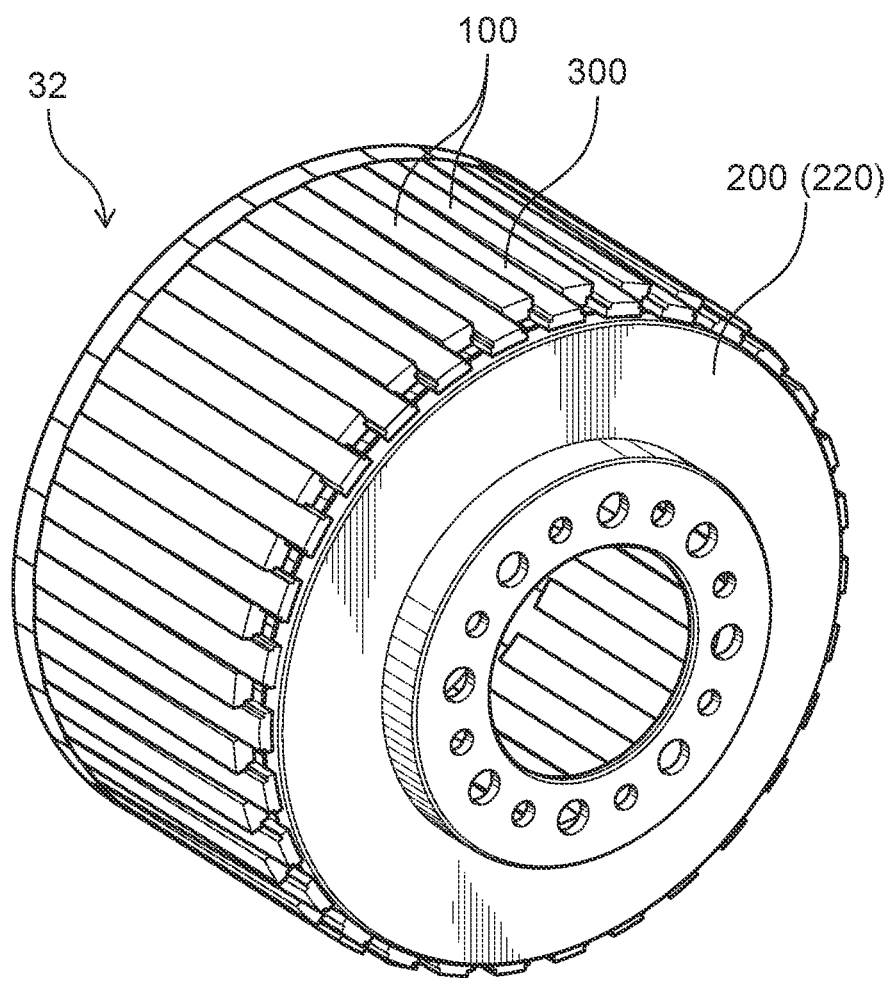
FIG. 6 is a perspective view of the pole piece assembly of the second rotor according to the exemplary embodiment.
Figure 7:
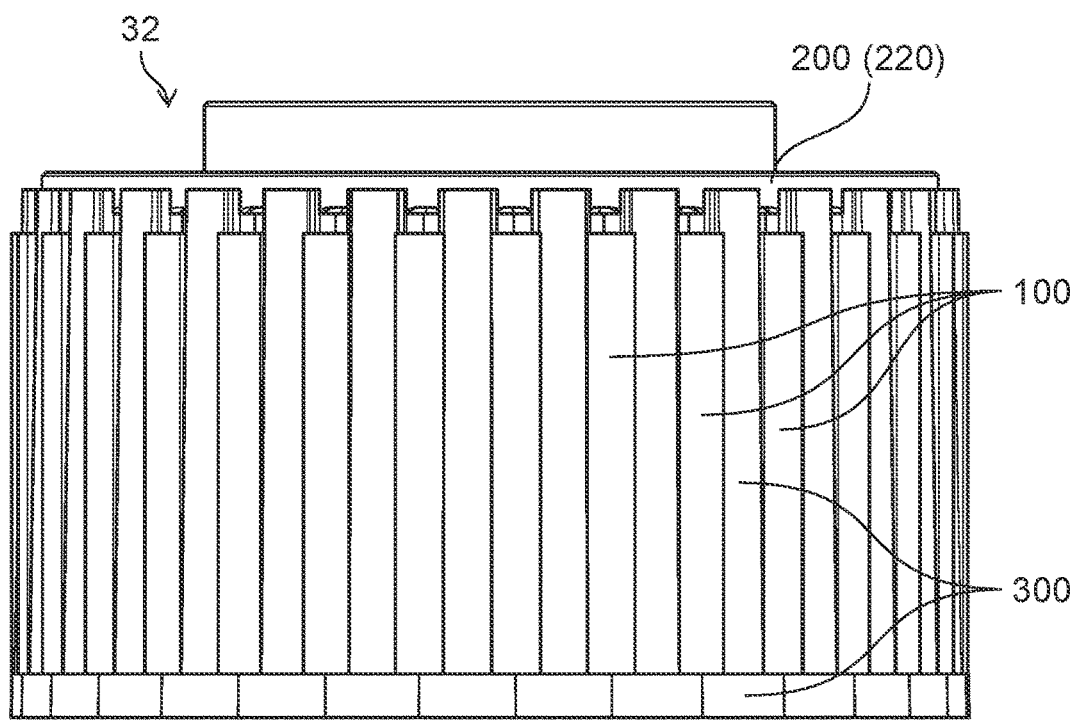
FIG. 7 is a side view of the pole piece assembly of the second rotor according to the exemplary embodiment.
Figure 8:
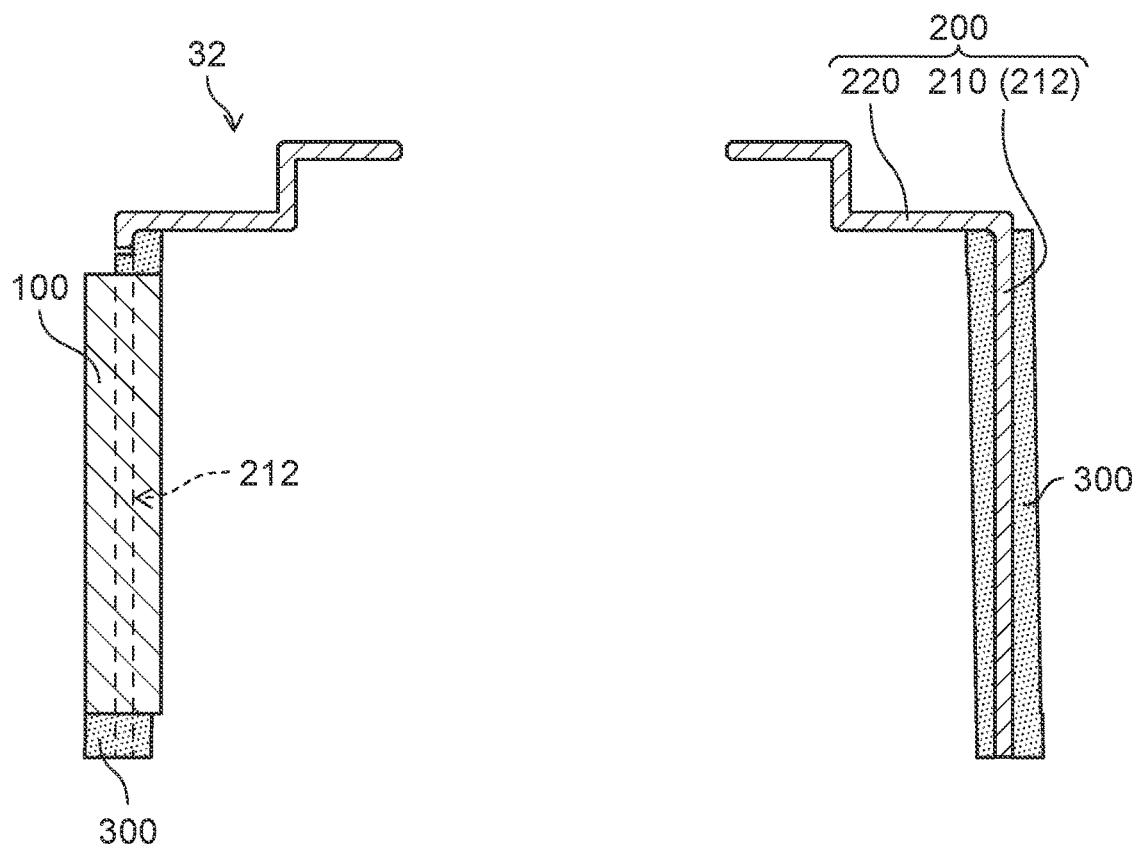
FIG. 8 is a cross-sectional view of the pole piece assembly of the second rotor according to the exemplary embodiment.
Figure 9:
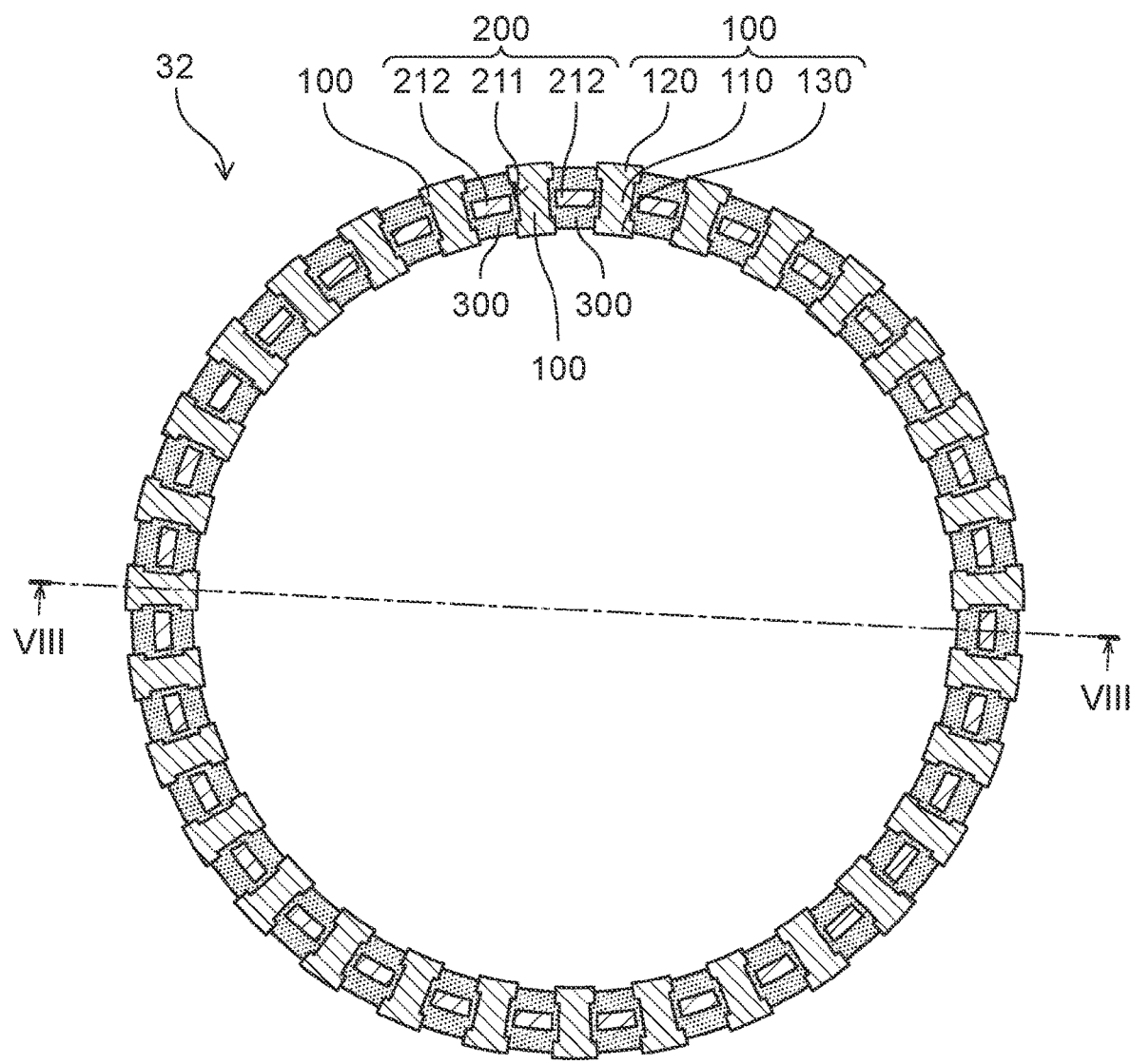
FIG. 9 is a cross-sectional view of the pole piece assembly of the second rotor according to the exemplary embodiment.

Next, a detailed structure of second rotor 30 will be described with reference to FIGS. 3 to 9. FIG. 3 is an external perspective view of second rotor 30 of magnetic geared motor 1 according to the exemplary embodiment. FIG. 4 is an exploded perspective view of second rotor 30. FIGS. 5 and 6 are perspective views of pole piece assembly 32 of second rotor 30. In FIG. 5, mold resin 300 of pole piece assembly 32 is illustrated partly transparent. FIG. 7 is a side view of pole piece assembly 32, and FIGS. 8 and 9 are cross-sectional views of pole piece assembly 32. FIG. 8 is a cross-section including the axis of second rotary shaft 31, illustrating a cross-section taken along line VIII-VIII in FIG. 9. FIG. 9 is a cross-section taken in a plane orthogonal to the axis of second rotary shaft 31. FIGS. 8 and 9 illustrate portions appearing in the cross section.

As illustrated in FIGS. 3 and 4, second rotor 30 includes second rotary shaft 31 and pole piece assembly 32. Second rotary shaft 31 and pole piece assembly 32 are fixed by screws 33. Therefore, pole piece assembly 32 and second rotary shaft 31 rotate integrally.

Pole piece assembly 32 has a substantially bottomed cylindrical shape having an opening at the bottom. In pole piece assembly 32, the plurality of pole pieces 100 and frame 200 are integrated with mold resin 300. That is, pole piece assembly 32 is an integrally molded part including the plurality of pole pieces 100, frame 200, and mold resin 300.

As illustrated in FIGS. 5 to 9, pole piece assembly 32 includes the plurality of pole pieces 100, frame 200, and mold resin 300. The plurality of pole pieces 100 and frame 200 are molded and fixed with mold resin 300.

As illustrated in FIG. 9, the plurality of pole pieces 100 is annularly arranged along the circumferential direction of second rotor 30. In the present exemplary embodiment, pole pieces 100 are annularly arranged at a constant interval along the circumferential direction of pole piece assembly 32 over the entire circumference.

Each of the plurality of pole pieces 100 is an elongated magnetic member made of a magnetic material. As illustrated in FIGS. 5 and 8, each of the plurality of pole pieces 100 is disposed so as its longitudinal direction to be parallel to the axis of second rotary shaft 31.

Figure 10:
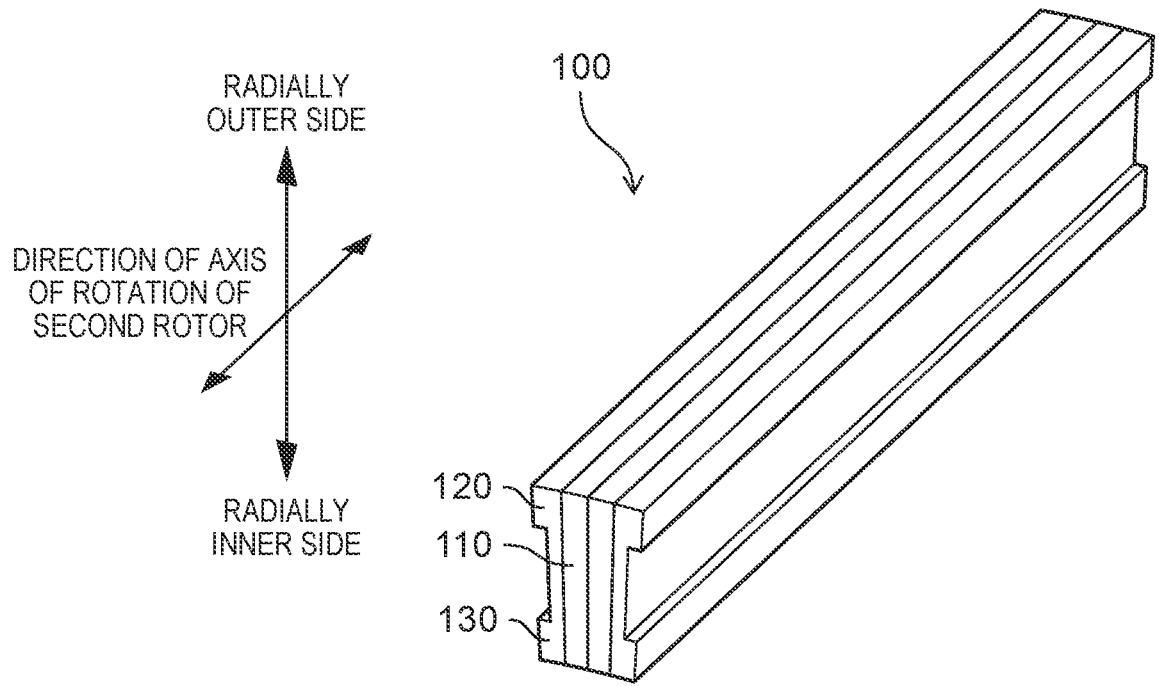
FIG. 10 is a perspective view illustrating an example of a structure of a pole piece of the second rotor according to the exemplary embodiment.

As illustrated in FIG. 10, in the present exemplary embodiment, each of the plurality of pole pieces 100 is a stacked body in which a plurality of steel sheets are stacked. Forming pole piece 100 as a stacked body of a plurality of stacked steel sheets as described above can reduce a loss due to eddy current in pole piece 100, whereby the torque and efficiency of second rotor 30 can be improved.

Figure 11:
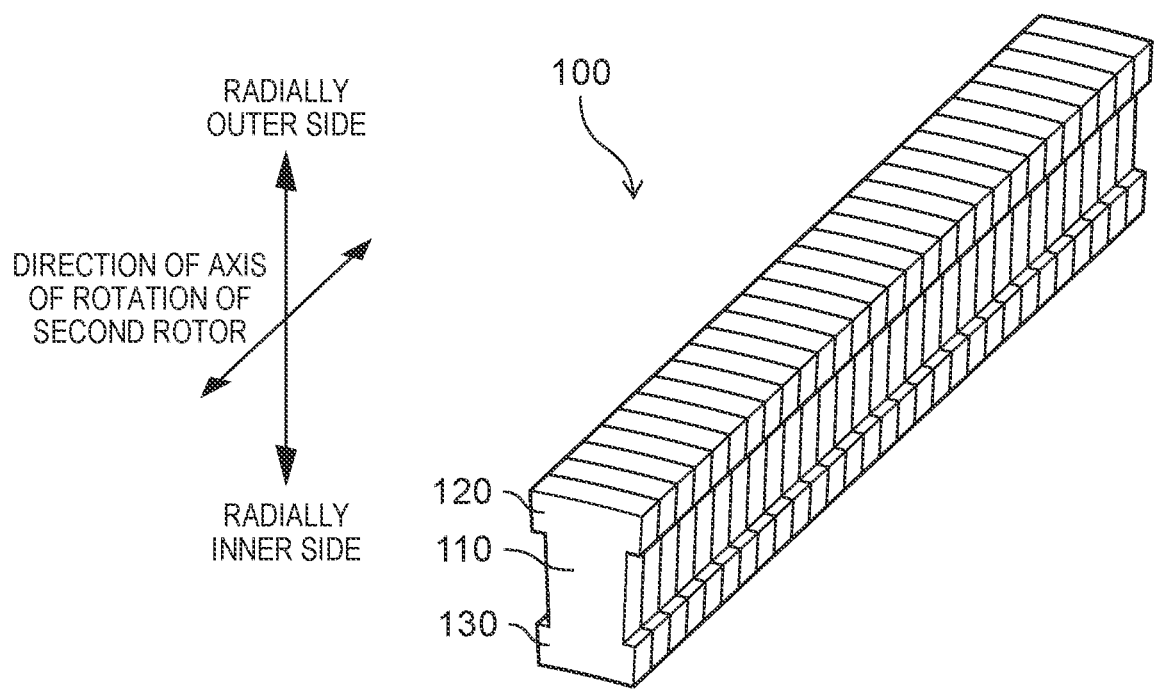
FIG. 11 is a perspective view illustrating another example of a structure of a pole piece of the second rotor according to the exemplary embodiment.

In this case, the stacking direction of a plurality of steel sheets constituting pole piece 100 may be orthogonal to the axis of rotation of second rotor 30 as illustrated in FIG. 10, or may be along the axis of rotation of second rotor 30 (that is, the axial direction of second rotary shaft 31) as illustrated in FIG. 11. FIG. 10 is a perspective view illustrating an example of the structure of pole piece 100. FIG. 11 is a perspective view illustrating another example of the structure of pole piece 100. From the viewpoint of improving magnetic characteristics of pole piece 100, the stacking direction of a plurality of steel sheets is preferably along the axis of rotation of second rotor 30 as illustrated in FIG. 11. Note that, pole piece 100 may be a bulk body made of a magnetic material instead of a stacked body of a plurality of steel sheets.

Frame 200 is a support member that supports the plurality of pole pieces 100. Thus, frame 200 preferably has a higher strength than pole pieces 100. Frame 200 is made of a non-magnetic material. That is, frame 200 needs to have a high strength and non-magnetism. As a material of frame 200, a metal material, a non-metal material, a resin material, or the like can be used. In the present exemplary embodiment, frame 200 is made of a stainless steel, but is not limited thereto.

As illustrated in FIG. 4, frame 200 has a substantially bottomed cylindrical shape having an opening at the bottom, and includes circumferential portion 210 serving as a frame body and having a substantially cylindrical shape and bottom 220 provided at an open face of circumferential portion 210. As described above, with bottom 220 provided to frame 200, frame 200 is given a high strength as compared with a case with no bottom 220 (that is, a case with only circumferential portion 210).

As illustrated in FIGS. 4 and 8, circumferential portion 210 of frame 200 is provided upright on the outer circumferential edge of bottom 220. As illustrated in FIGS. 4 and 5, a plurality of gaps 211 respectively corresponding to the plurality of pole pieces 100 and into which the respective pole piece 100 is at least partly inserted is formed in circumferential portion 210. The plurality of gaps 211 is formed in one-to-one correspondence with the plurality of pole pieces 100.

In the present exemplary embodiment, each of the plurality of gaps 211 is a slit extending in a direction to separate from bottom 220. The slit formed as gap 211 is a linear open hole having a constant width. As a plurality of slits is formed in circumferential portion 210 as described above, circumferential portion 210 has a plurality of extension parts 212. That is, a part of circumferential portion 210 between two adjacent slits (gaps 211) is extension part 212. In other words, a gap between two adjacent extension parts 212 among the plurality of extension parts 212 is a slit (gap 211). Therefore, extension part 212 is formed linearly with a constant width.

As illustrated in FIGS. 4 and 8, each of the plurality of extension parts 212 extends in a direction to separate from bottom 220. In the present exemplary embodiment, circumferential portion 210 has 31 extension parts 212, and all the 31 extension parts 212 extend in a direction parallel to the axis of rotation of second rotor 30 from the vicinity of bottom 220 of circumferential portion 210. Therefore, a plurality of slits respectively formed as the plurality of gaps 211 exists as close as to the vicinity of bottom 220 of circumferential portion 210. A plurality of slits respectively formed as the plurality of gaps 211 is opened at a side opposite to bottom 220. Therefore, the plurality of extension parts 212 has free ends that are not connected to each other at a side opposite to bottom 220. The plurality of extension parts 212 is annularly arranged at a constant interval. The plurality of extension parts 212 thus configured forms a comb shape. Note that, each of the slits formed as gap 211 may be opened at the side opposite to bottom 220.

One of the plurality of pole pieces 100 exists at least partly between two adjacent extension parts 212 (that is, a slit, or gap 211). In the present exemplary embodiment, each of the plurality of pole pieces 100 has a shape extending along the longitudinal direction of the slit, or gap 211, and is disposed between two adjacent extension parts 212 as illustrated in FIGS. 5 and 9. That is, each pole piece 100 is sandwiched between two adjacent extension parts 212. Therefore, a single pole piece 100 is entirely located in a single slit.

As illustrated in FIG. 9, in the present exemplary embodiment, each pole piece 100 is not in contact with extension part 212 in the circumferential direction. Therefore, each pole piece 100 is sandwiched between two adjacent extension parts 212 with a distance (gap) between pole piece 100 and extension part 212 that are next to each other.

Bottom 220 serves as a bracket to which second rotary shaft 31 is attached. Specifically, bottom 220 is provided with a plurality of screw holes, and bottom 220 and second rotary shaft 31 are fixed by screwing screws 33 into the screw holes. The way of attaching bottom 220 to second rotary shaft 31 is not limited to screwing.

As illustrated in FIGS. 3 to 8, bottom 220 of frame 200 has a face intersecting the axis of rotation of second rotor 30. In the present exemplary embodiment, bottom 220 includes a plate having an annular disk-shaped surface as a plane orthogonal to the axis of rotation of second rotor 30. Specifically, bottom 220 includes an annular disk-shaped first plate and an annular disk-shaped second plate with a step therebetween. The first plate of bottom 220 is connected to circumferential portion 210, and the second plate of bottom 220 is in the inner side of the first plate. A plurality of screw holes are provided in the second plate of bottom 220, and second rotary shaft 31 is attached to the second plate of bottom 220.

Frame 200 configured as described above is an integrated part manufactured by any one or more of processing methods of deep drawing, die casting, and machining. Frame 200 is not limited to an integrated part, and may be a joined part in which a plurality of parts is assembled and joined. For example, circumferential portion 210 and bottom 220 may be prepared as separate parts produced by the above-described processing methods or bending, and then joined to each other by any one or more of methods of bonding, brazing, crimping, welding, screwing, and resin molding to form a joined part.

Pole pieces 100 in pole piece assembly 32 all have the same shape. In the present exemplary embodiment, as illustrated in FIGS. 9 to 11, pole piece 100 has an I-shaped cross-section.

Specifically, as illustrated in FIG. 9, each pole piece 100 includes first section 110 located in a gap between two adjacent extension parts 212, second section 120 located on the outer side of first section 110 regarding the radial direction of second rotor 30, and third section 130 located on the inner side of first section 110 regarding the radial direction of second rotor 30. In a cross section taken in a plane orthogonal to the axis of rotation of second rotor 30, two ends of each of second section 120 and third section 130 regarding the circumferential direction of second rotor 30 protrude in the circumferential direction of second rotor 30 further than first section 110.

In the present exemplary embodiment, leading ends of the two ends of each of second section 120 and third section 130 overlap extension part 212 in the radial direction of second rotor 30. That is, the end of extension part 212 of frame 200 in the width direction (that is, the circumferential direction of frame 200) is intruding into the recess in a side surface of pole piece 100.

As illustrated in FIGS. 5 to 9, the plurality of pole pieces 100 and frame 200 are integrated with mold resin 300. Specifically, the plurality of pole pieces 100 and circumferential portion 210 of frame 200 are integrated with mold resin 300.

Mold resin 300 covers frame 200 with pole pieces 100 partly inserted into gaps 211 of frame 200. Specifically, as illustrated in FIG. 9, mold resin 300 covers circumferential portion 210 of frame 200 with each pole piece 100 disposed between two adjacent extension parts 212. In the present exemplary embodiment, mold resin 300 fills a space between two adjacent pole pieces 100. Thus, each extension part 212 between two adjacent pole pieces 100 is entirely covered with mold resin 300 with no surface of extension part 212 exposed.

In the present exemplary embodiment, pole piece 100 and extension part 212 are not in contact with each other in the circumferential direction of circumferential portion 210, and there is a gap between pole piece 100 and extension part 212. Mold resin 300 exists also in the gap. That is, mold resin 300 intrudes into the gap between pole piece 100 and extension part 212 during resin molding. Therefore, as illustrated in FIG. 9, in a cross-section taken in a plane orthogonal to axis of rotation of second rotor 30, the inner surface of second section 120, the side surface of first section 110, and the outer surface of third section 130 of each pole piece 100 are in contact with mold resin 300.

Mold resin 300 is required to cover frame 200 so that at least one of the radially inner side surface and the radially outer side surface of the plurality of pole pieces 100 is exposed. In the present exemplary embodiment, mold resin 300 covers circumferential portion 210 of frame 200 so that both the radially inner side surface and the radially outer side surface of each of the plurality of pole pieces 100 are exposed. That is, the radially inner surface and the radially outer surface of each pole piece 100 are not covered with mold resin 300.

Mold resin 300 is an insulating resin material, for example, an epoxy resin or a polyester resin. Furthermore, mold resin 300 is a thermosetting resin. In the present exemplary embodiment, a two-component mixed epoxy resin that is a thermosetting resin is used as mold resin 300. Mold resin 300 may be a different resin material such as unsaturated polyester which is a thermosetting resin.

Figure 12:
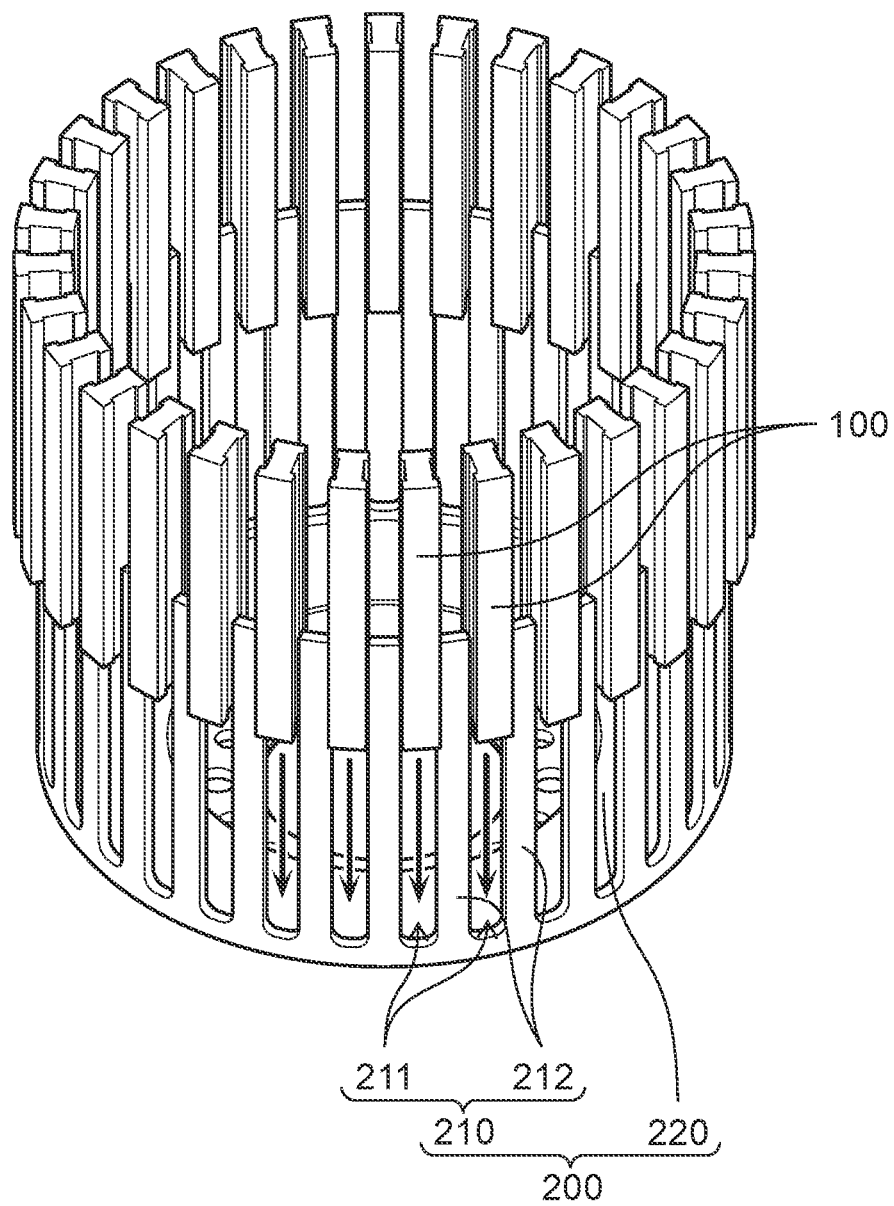
FIG. 12 is a view illustrating a way of manufacturing the pole piece assembly of the second rotor according to the exemplary embodiment where pole pieces are being arranged in a frame.
Figure 13:
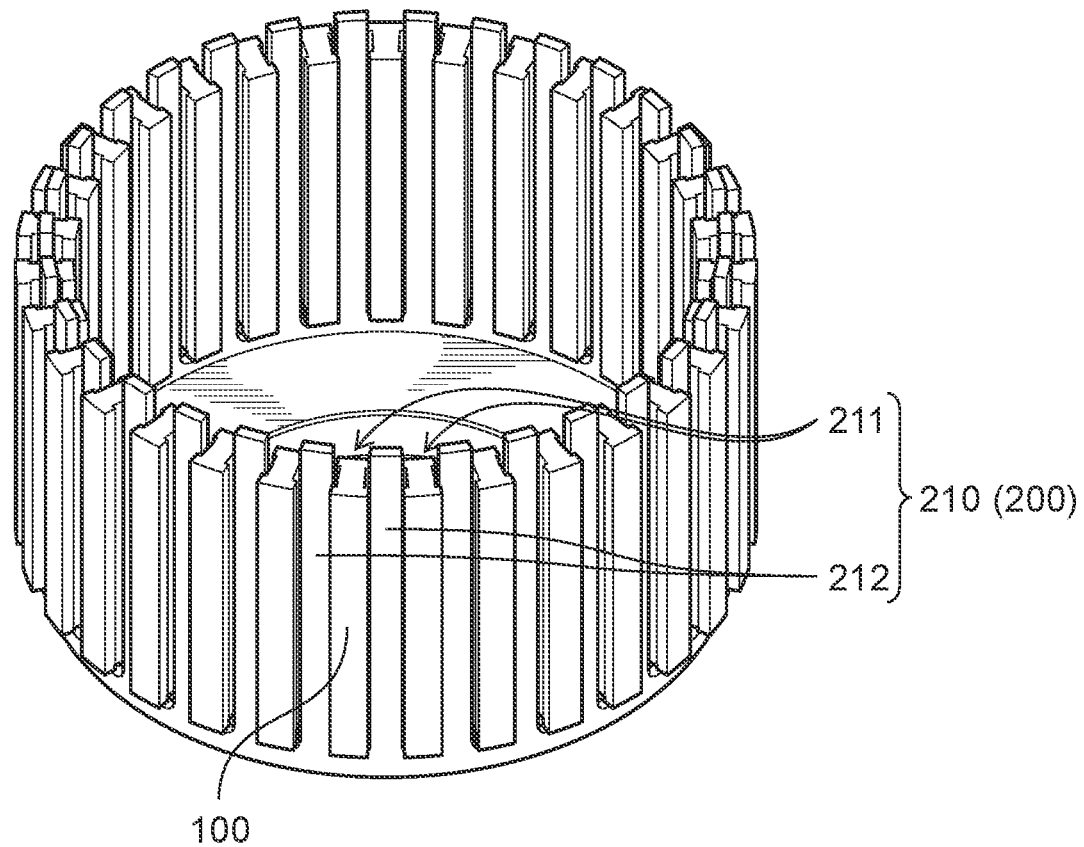
FIG. 13 is a view illustrating the way of manufacturing the pole piece assembly of the second rotor according to the exemplary embodiment where the pole pieces have been arranged in the frame.
Figure 14A:
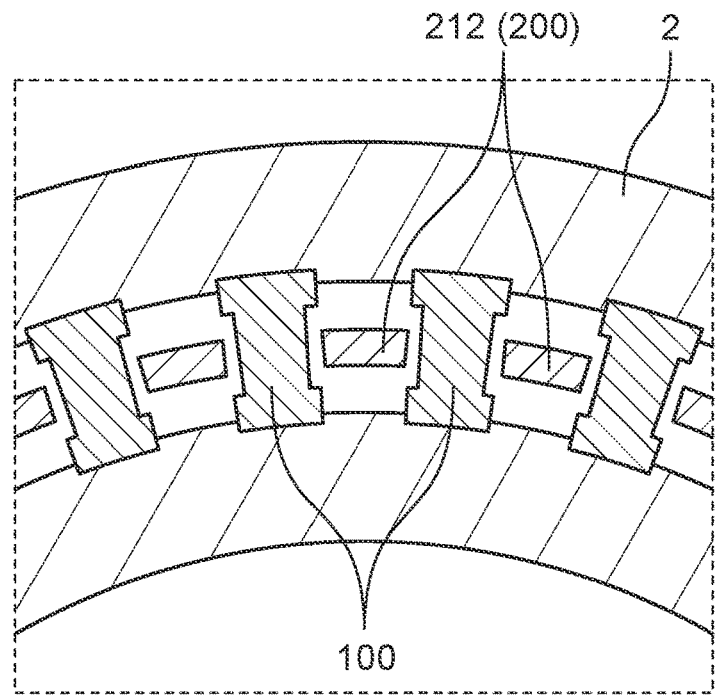
FIG. 14A is a view illustrating the way of manufacturing the pole piece assembly of the second rotor according to the exemplary embodiment where a mold in which the pole pieces and the frame are arranged is set.
Figure 14B:
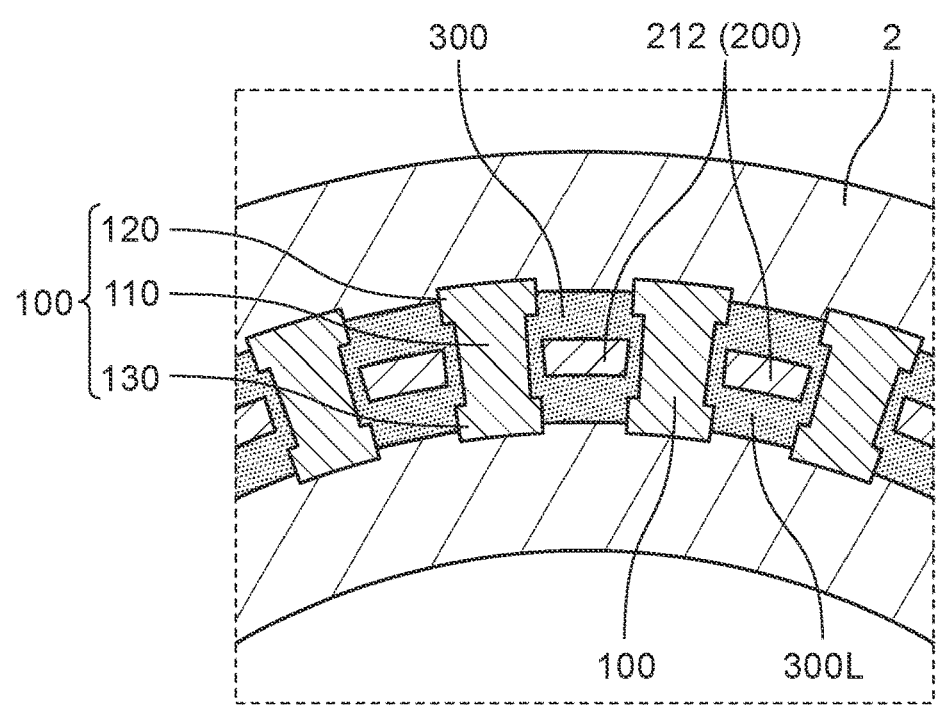
FIG. 14B is a view illustrating the way of manufacturing the pole piece assembly of the second rotor according to the exemplary embodiment where liquid resin is injected in the mold in which the pole pieces and the frame are arranged.

A way of integrally molding pole pieces 100 and frame 200 with mold resin 300 will be described with reference to FIGS. 12, 13, 14A, and 14B. FIGS. 12 to 14B are views for explaining a way of manufacturing pole piece assembly 32 of second rotor 30 according to the exemplary embodiment. FIG. 12 illustrates pole pieces 100 being arranged on frame 200. FIG. 13 illustrates frame 200 on which pole pieces 100 are arranged. FIGS. 14A and 14B illustrate a state where liquid resin 300L is injected into mold 2 in which pole pieces 100 and frame 200 are arranged.

First, the plurality of pole pieces 100 is arranged on frame 200. The plurality of pole pieces 100 is arranged on frame 200 such that each of the plurality of pole pieces 100 is partly inserted into corresponding gap 211 of circumferential portion 210 of frame 200.

In the present exemplary embodiment, as illustrated in FIG. 12, pole piece 100 is first inserted into gap 211 formed as a slit. That is, pole piece 100 is inserted between two adjacent extension parts 212. For example, each pole piece 100 is inserted into the corresponding slit (between two adjacent extension parts 212) from an opening at an end of the slit, or gap 211, toward bottom 220. Each pole piece 100 is thereby disposed at a predetermined position in the slit, or gap 211, as illustrated in FIG. 13. The plurality of pole pieces 100 is positioned in frame 200. Positioning of the plurality of pole pieces 100 can be performed using a jig or a mold.

Next, frame 200 on which the plurality of pole pieces 100 is arranged is molded with resin. Specifically, as illustrated in FIG. 14A, in a state where frame 200 in which pole pieces 100 are arranged in the slits, or gaps 211, (each between two adjacent extension parts 212) is housed in mold 2, liquid resin 300L is injected between two adjacent pole pieces 100 as illustrated in FIG. 14B. In this state, in the present exemplary embodiment, pole piece 100 and extension part 212 are not in contact with each other in the circumferential direction of circumferential portion 210 of frame 200, so that there is a gap between pole piece 100 and extension part 212. Therefore, liquid resin 300L intrudes also in the gap and is filled between two adjacent pole pieces 100 so as to surround the entire extension part 212.

Thereafter, liquid resin 300L is cured by heating or drying to form hard mold resin 300. This enables integrally molding pole pieces 100 and frame 200 with mold resin 300 to manufacture pole piece assembly 32 of second rotor 30 having a structure illustrated in FIGS. 5 to 9.

The step of arranging the plurality of pole pieces 100 on frame 200 as illustrated in FIGS. 12 and 13 may be performed using mold 2 illustrated in FIGS. 14A and 14B. That is, positioning of the plurality of pole pieces 100 may be performed using mold 2.

Figure 15:
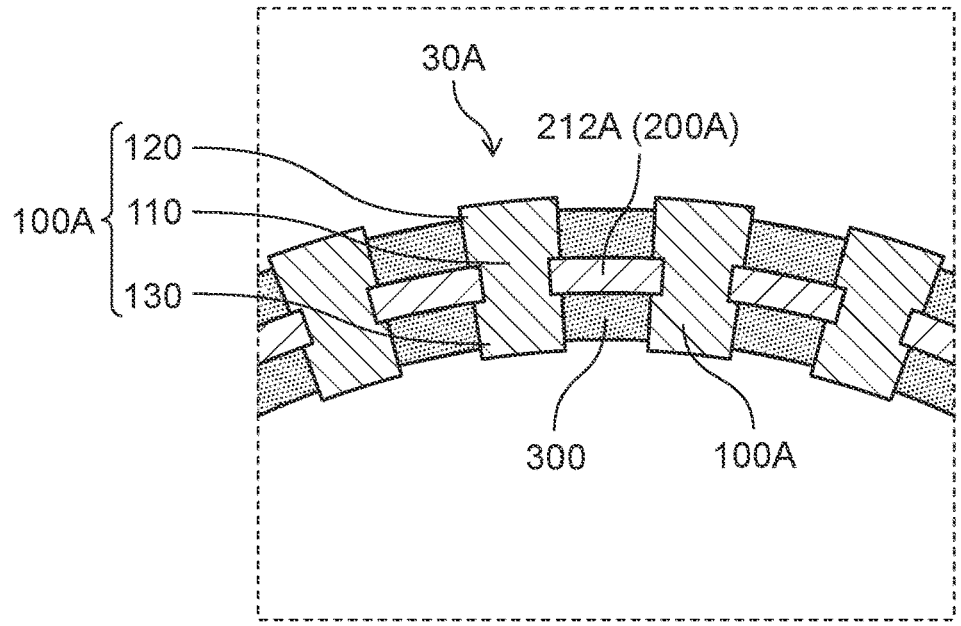
FIG. 15 is a cross-sectional view illustrating a configuration of a second rotor according to a first exemplary modification.

In the present exemplary embodiment, there is a gap between pole piece 100 and extension part 212, and pole piece 100 and extension part 212 are not in contact with each other in the circumferential direction of second rotor 30, but the present exemplary embodiment is not limited to this configuration. It may be configured with no gap between pole piece 100 and extension part 212, and thus pole piece 100 and extension part 212 are in contact with each other in the circumferential direction of second rotor 30. For example, as in second rotor 30A illustrated in FIG. 15, pole piece 100A and extension part 212A may contact each other such that an end in the width direction of extension part 212A of frame 200A fits in a recess in a side surface of pole piece 100A having an I-shaped cross-section. FIG. 15 will be described in the following (exemplary modification).

As described above, second rotor 30 of magnetic geared motor 1 according to the present exemplary embodiment includes the plurality of pole pieces 100 annularly arranged along the circumferential direction of second rotor 30, and frame 200 including circumferential portion 210 having the plurality of gaps 211 respectively corresponding to the plurality of pole pieces 100 and in each of which the corresponding one of the plurality of pole pieces 100 is at least partly inserted. The plurality of pole pieces 100 and frame 200 are integrated with mold resin 300.

With this configuration, frame 200 can receive torque and force such as radial force of the plurality of pole pieces 100 generated with rotation of second rotor 30. As a result, the plurality of pole pieces 100 can be supported with high rigidity equal to or higher than the rigidity of a rotor having a structure in which a plurality of pole pieces is supported by metal rods.

Moreover, in second rotor 30 according to the present exemplary embodiment, since the plurality of pole pieces 100 and frame 200 are fixed by mold resin 300, the plurality of pole pieces 100 can be fixed without fastening with screws or nuts or fitting of metals. Accordingly, simultaneous contact at multiple points does not occur, which improves easiness of assembling as compared with a rotor having a structure in which a plurality of pole pieces is supported by a plurality of metal rods. This also improves mass productivity and reliability of second rotor 30 and magnetic geared motor 1.

Furthermore, fixing the plurality of pole pieces 100 and frame 200 with mold resin 300 suppresses residual stress in second rotor 30 as compared with a rotor having a structure in which a plurality of pole pieces is supported by a plurality of metal rods.

As described above, according to magnetic geared motor 1 according to the present exemplary embodiment, a magnetic geared motor that can support pole pieces 100 with high rigidity, has small residual stress, and is very easy to assemble can be provided.

Furthermore, as in the present exemplary embodiment, integrating the plurality of pole pieces 100 and frame 200 with resin molding enables accurately positioning pole pieces 100 with a mold or the like during resin molding. As a result, the coaxiality between pole pieces 100 and bearings as well as the roundness of pole pieces 100 and second rotor 30 can be improved. Therefore, magnetic geared motor 1 that manifests high performance and has high reliability can be provided.

EXEMPLARY MODIFICATIONS

Although magnetic geared motor 1 according to the present disclosure has been described above based on the exemplary embodiment, the present disclosure is not limited to the exemplary embodiment. Magnetic geared motor 1 according to the present disclosure may be modified into exemplary modifications described below.

First Exemplary Modification

Second rotor 30A according to a first exemplary modification will be described with reference to FIG. 15. FIG. 15 is a cross-sectional view illustrating a configuration of second rotor 30A according to the first exemplary modification.

For example, as in second rotor 30A illustrated in FIG. 15, pole piece 100A and extension part 212A may contact each other such that an end in the width direction of extension part 212A of frame 200A fits in a recess in a side surface of pole piece 100A having an I-shaped cross-section.

Second Exemplary Modification

Figure 16:
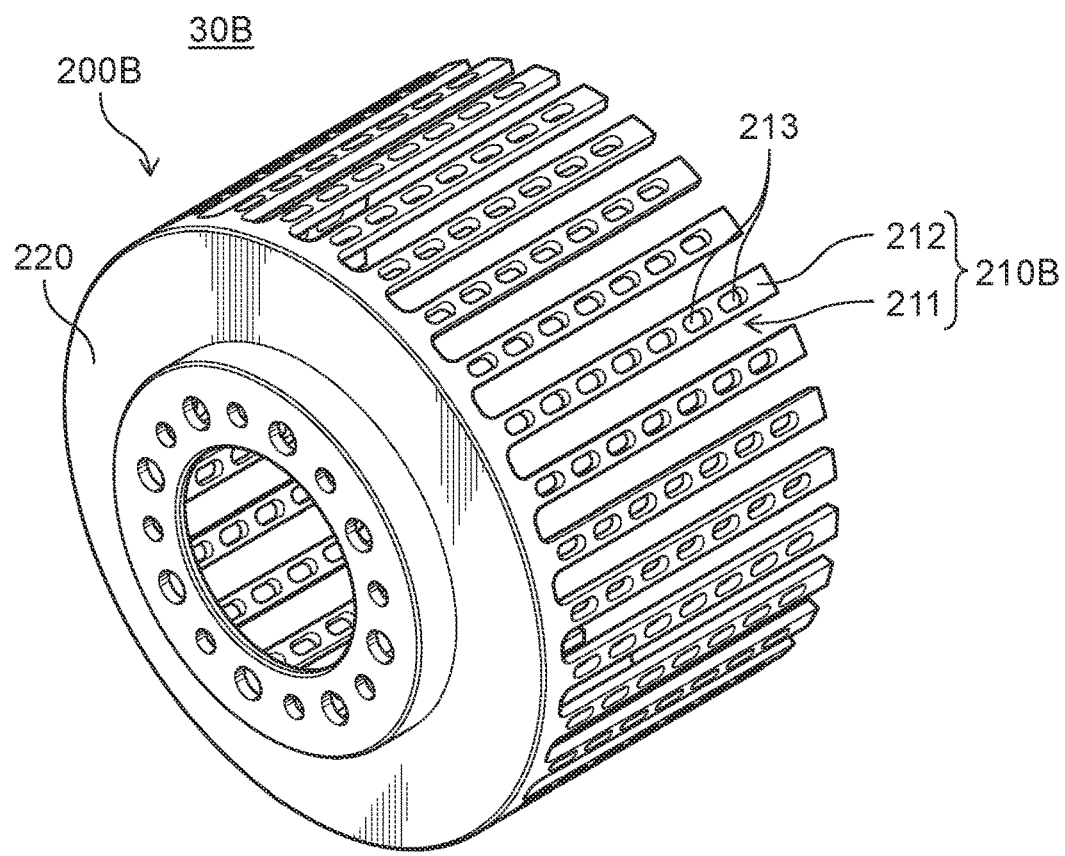
FIG. 16 is a perspective view illustrating a configuration of a frame of a second rotor according to a second exemplary modification.
Figure 17:
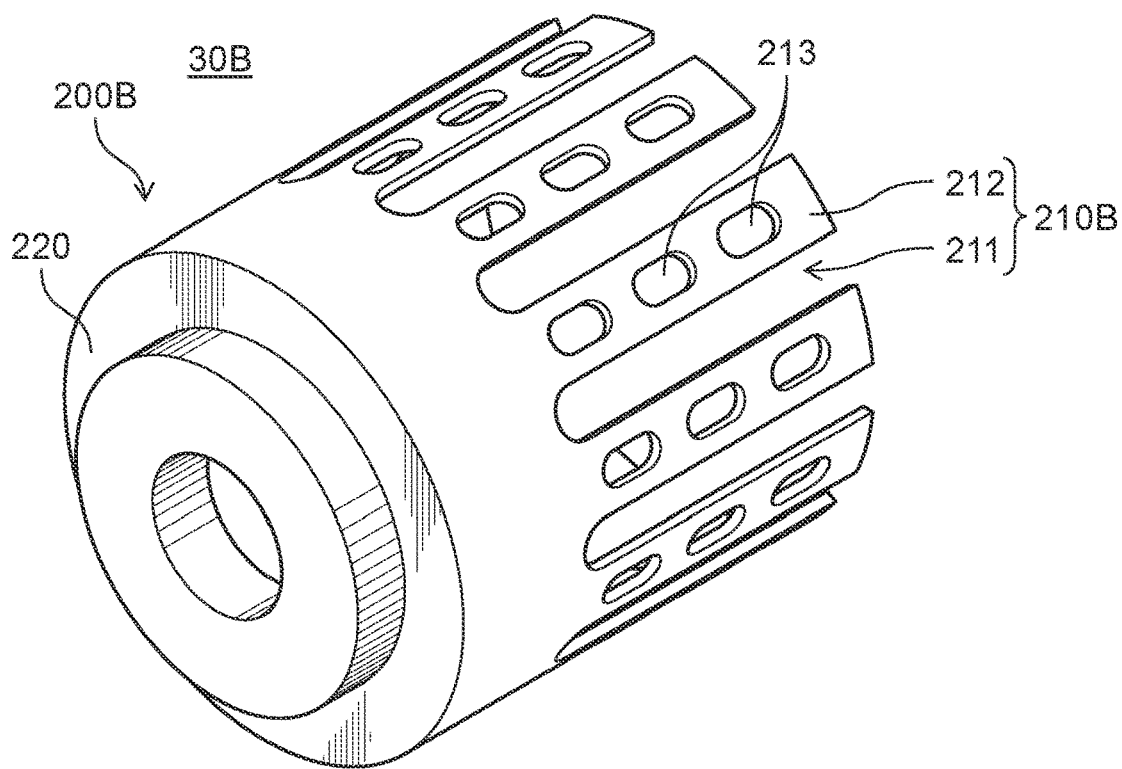
FIG. 17 is a perspective view illustrating a configuration of another frame of the second rotor according to the second exemplary modification.

Second rotor 30B according to a second exemplary modification will be described with reference to FIGS. 16 and 17. FIG. 16 is a perspective view illustrating a configuration of frame 200B of second rotor 30B according to the second exemplary modification. FIG. 17 is a perspective view illustrating a configuration of another frame 200B of second rotor according to the second exemplary modification.

For example, when frame 200 of second rotor 30 is made of a metal, an eddy current is generated in extension parts 212 of frame 200, so that it is preferable that open hole 213 is formed in at least one of a plurality of extension parts 212 of circumferential portion 210B as in frame 200B of second rotor 30B illustrated in FIG. 16. Generation of an eddy current in frame 200B can be suppressed by forming open hole 213 in extension part 212.

A larger eddy current is generated in frame 200B for a larger width of extension part 212 as in frame 200B illustrated in FIG. 17. Therefore, from the viewpoint of suppressing an eddy current, it is much effective to form open hole 213 in frame 200B illustrated in FIG. 17 in which extension parts 212 are wider than extension parts 212 of frame 200B illustrated in FIG. 16.

However, in a case where only a single open hole 213 is formed in extension part 212, too large opening of open hole 213 may reduce the rigidity of frame 200B. Therefore, as in frame 200B illustrated in FIGS. 16 and 17, a plurality of open holes 213 may be formed along the longitudinal direction of extension part 212. Since one or a plurality of bridges exists between adjacent open holes 213, the decrease in rigidity of frame 200B due to open holes 213 formed in extension parts 212 can be suppressed.

Third Exemplary Modification

Second rotor 30C according to a third exemplary modification will be described with reference to FIGS. 18 to 21.

Figure 18:
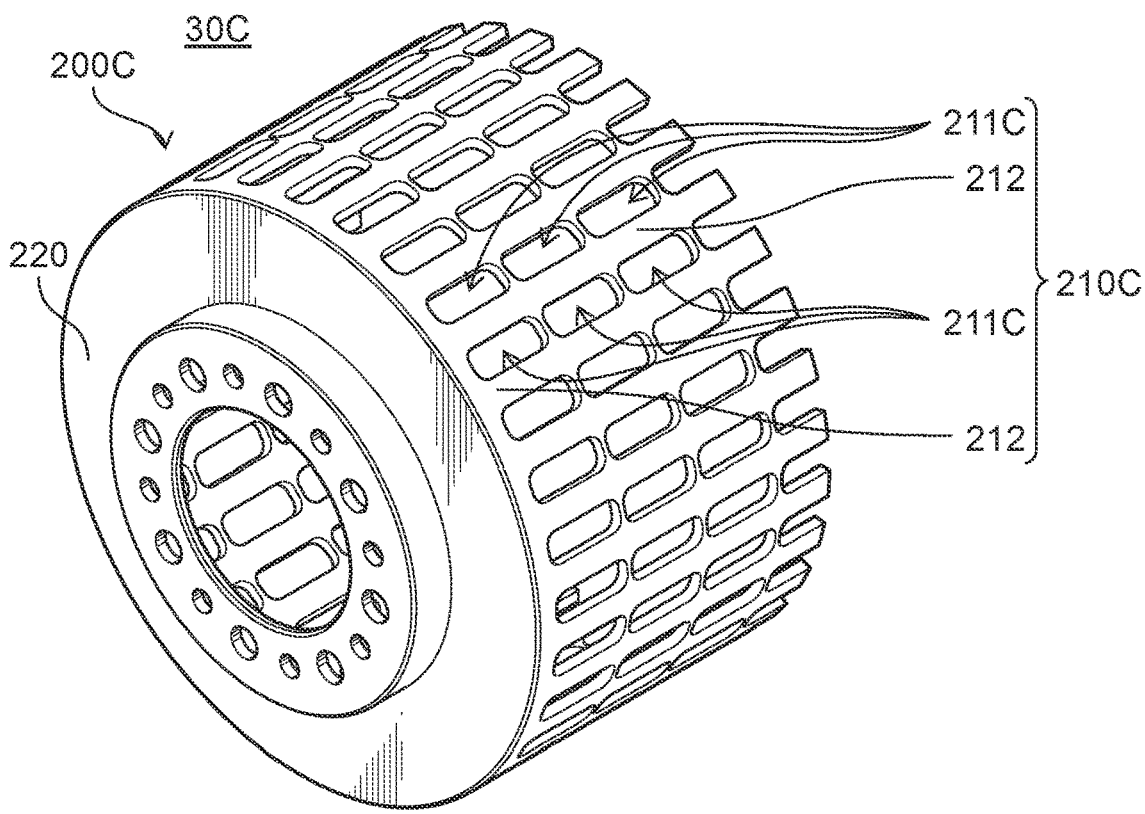
FIG. 18 is a perspective view illustrating a configuration of a frame of a second rotor according to a third exemplary modification.
Figure 19:
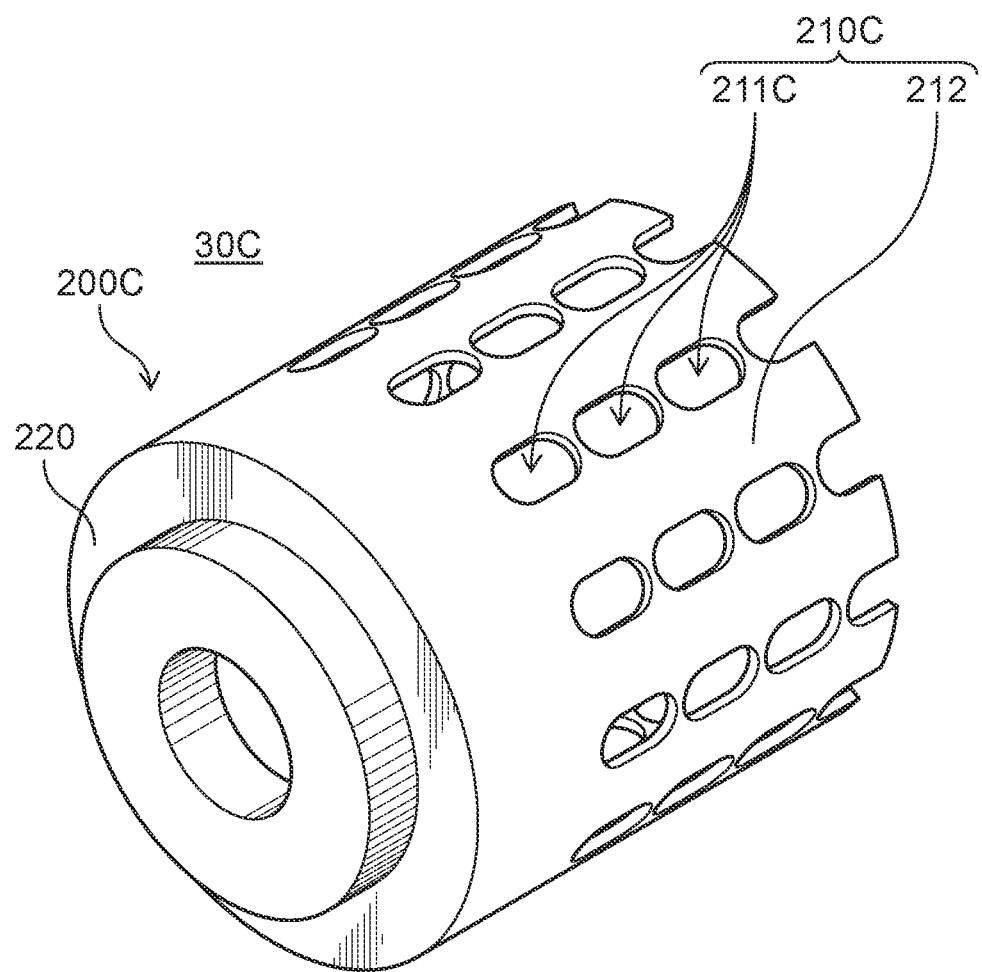
FIG. 19 is a perspective view illustrating a configuration of another frame of the second rotor according to the third exemplary modification.
Figure 20A:
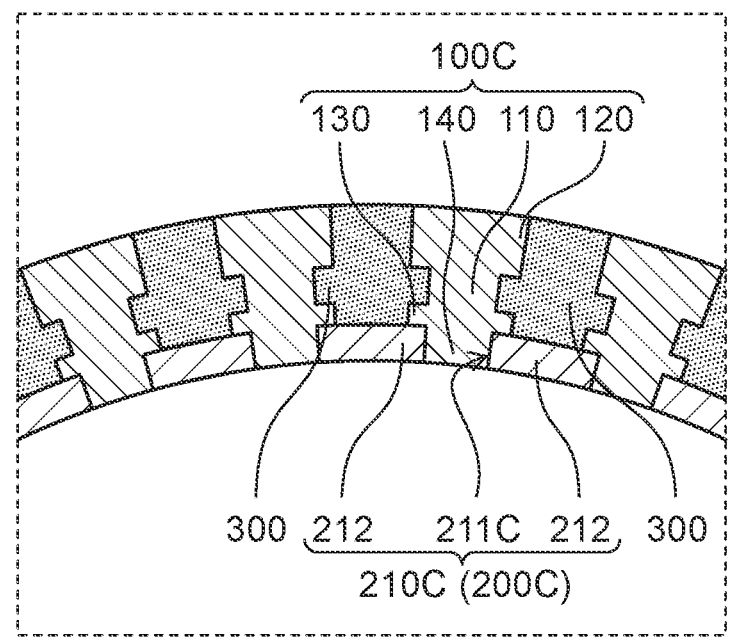
FIG. 20A is a cross-sectional view illustrating a configuration of the second rotor according to the third exemplary modification.
Figure 20B:
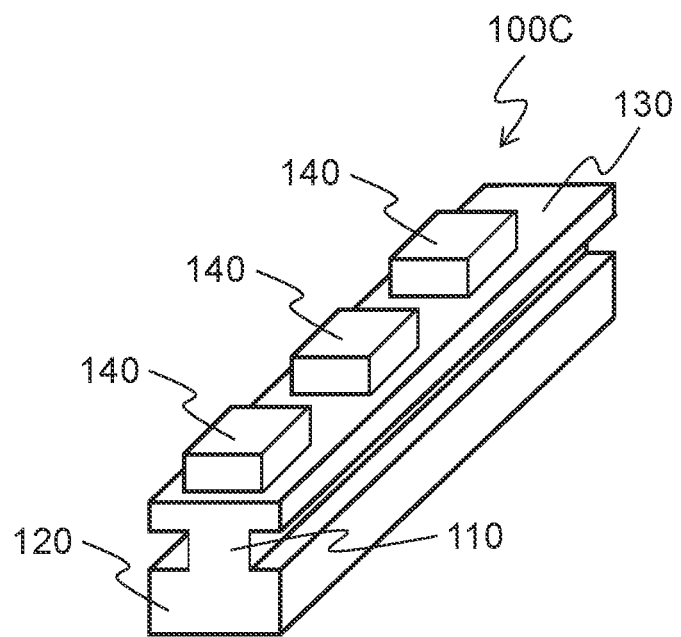
FIG. 20B is a perspective view illustrating a configuration of a pole piece used in the second rotor according to the third exemplary modification.
Figure 21:
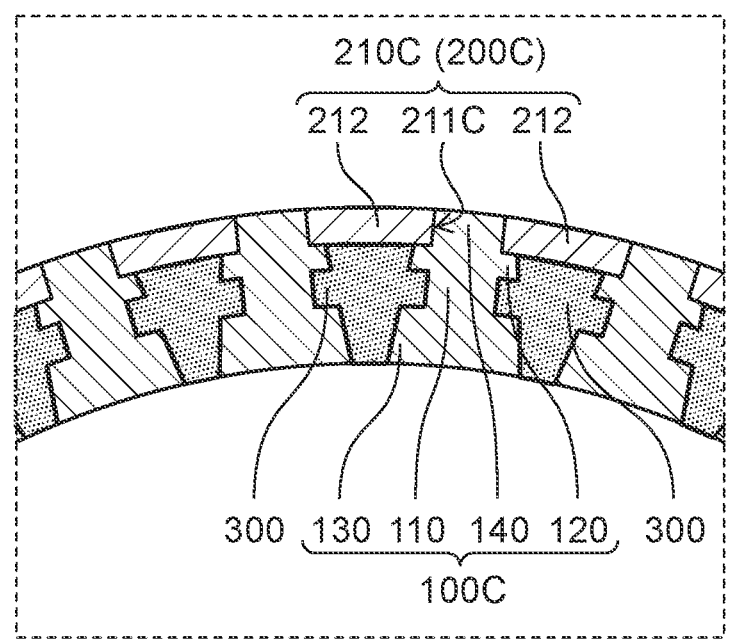
FIG. 21 is a cross-sectional view illustrating another configuration of the second rotor according to the third exemplary modification.

FIG. 18 is a perspective view illustrating a configuration of frame 200C of second rotor 30C according to the third exemplary modification. FIG. 19 is a perspective view illustrating a configuration of another frame 200C of second rotor 30C according to the third exemplary modification. FIG. 20A is a cross-sectional view illustrating a configuration of second rotor 30C according to the third exemplary modification. FIG. 20B is a perspective view illustrating a configuration of pole piece 100C used in the second rotor 30C according to the third exemplary modification. FIG. 21 is a cross-sectional view illustrating another configuration of second rotor 30C according to the third exemplary modification.

In the above-described exemplary embodiment, each of the plurality of gaps 211 in circumferential portion 210 of frame 200 is a single slit extending along the axis of second rotary shaft 31 of second rotor 30, but the present disclosure is not limited to this configuration. The plurality of gaps 211 may be, for example, a plurality of through-holes 211C formed in circumferential portion 210C as in frame 200C of second rotor 30C illustrated in FIG. 18. That is, each of the plurality of through-holes 211C may be a row of a plurality of open holes arranged along a direction parallel to the axis of rotation of second rotor 30C (axial direction of second rotary shaft 31), where a plurality of rows of open holes is provided in circumferential portion 210C over the entire circumferential direction of circumferential portion 210C. When a plurality of rows of openings constitutes the plurality of through-holes 211C, the width of extension part 212 may be large like in frame 200C illustrated in FIG. 19. Accordingly, the rigidity of frame 200C can be increased.

In addition, when a plurality of rows of openings constitutes the plurality of through-holes 211C as in frame 200C illustrated in FIGS. 18 and 19, the structure of pole piece 100 in the exemplary embodiment described above does not allow pole piece 100 to be entirely disposed in through-hole 211C. Therefore, when using frame 200C having the structure illustrated in FIGS. 18 and 19, pole piece 100C having a shape illustrated in FIG. 20A, 20B, or 21 is preferably used. FIG. 20B illustrates a configuration of a single pole piece 100C. As illustrated in FIGS. 20A, 20B, and 21, each of a plurality of pole pieces 100C used for frame 200C has a plurality of projections 140 each of which is inserted into the corresponding one of the plurality of through-holes 211C, which is a plurality of rows of openings.

In this case, as illustrated in FIG. 20A, when each of the plurality of pole pieces 100C is disposed in the radially outer side of circumferential portion 210C of frame 200C, the plurality of projections 140 of each pole piece 100C projects toward the radially inner side of circumferential portion 210C. That is, pole piece 100C illustrated in FIG. 20B is disposed on frame 200C so as projections 140 to project toward the radially inner side of circumferential portion 210C.

Meanwhile, as illustrated in FIG. 21, when each of the plurality of pole pieces 100C is disposed in the radially inner side of circumferential portion 210C of frame 200C, the plurality of projections 140 of each pole piece 100C projects toward the radially outer side of circumferential portion 210C. That is, pole piece 100C is disposed on frame 200C so as projections 140 to project toward the radially outer side of circumferential portion 210C. Note that, for pole piece 100C illustrated in FIG. 21, pole piece 100C illustrated in FIG. 20B can be used.

Projection 140 of each pole piece 100C may fit into through-hole 211C with no gap at least in the circumferential direction as illustrated in FIGS. 20A and 21, or not fit into through-hole 211C. Pole piece 100C illustrated in FIGS. 20A and 21 may be used for second rotor 30 in the exemplary embodiment described above.

Fourth Exemplary Modification

Figure 22:
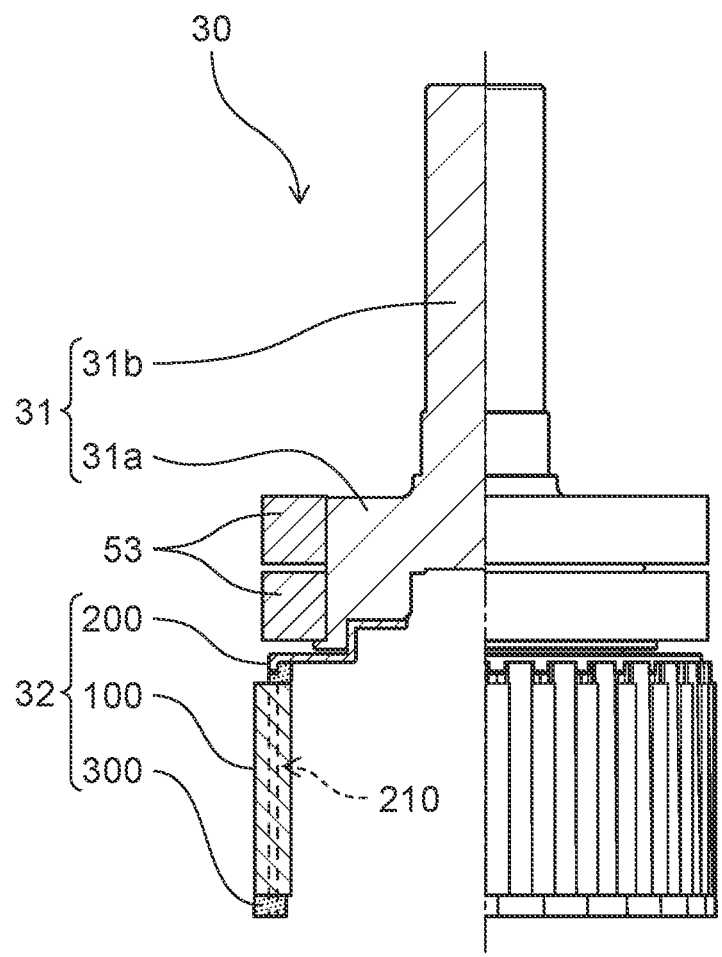
FIG. 22 is a sectional view of the second rotor according to the exemplary embodiment.
Figure 23:
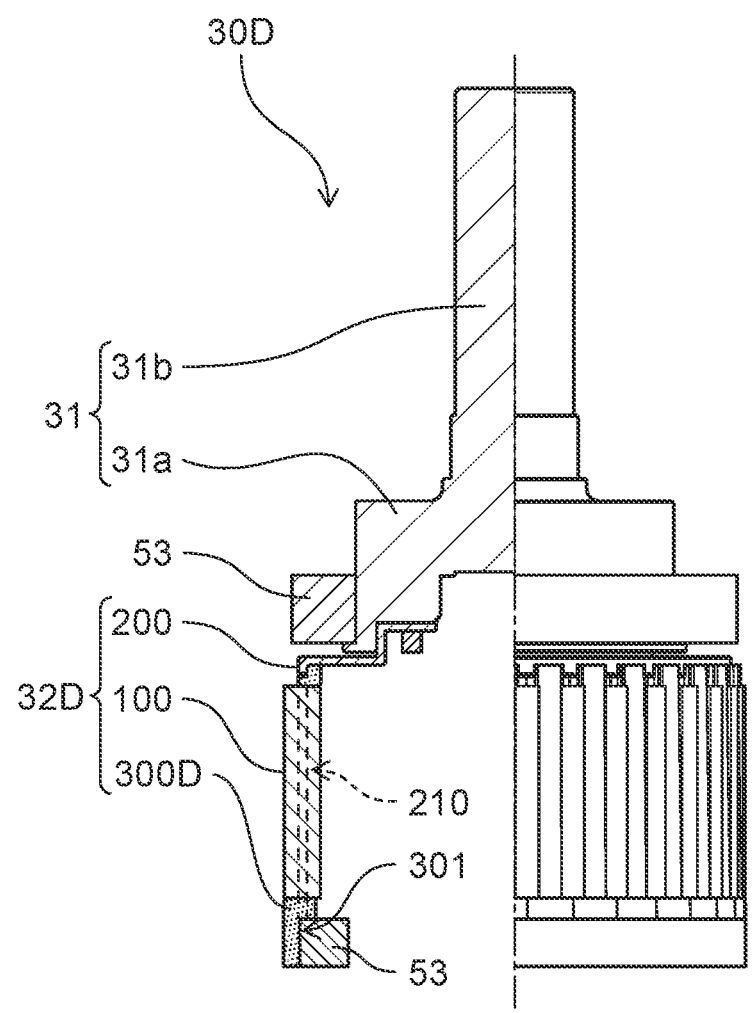
FIG. 23 is a cross-sectional view of a second rotor according to a fourth exemplary modification.

Second rotor 30D according to a fourth exemplary modification will be described with reference to FIG. 23. FIG. 23 is a cross-sectional view of second rotor 30D according to the fourth exemplary modification. FIG. 22 is a cross-sectional view of second rotor 30 according to the exemplary embodiment described above.

Third bearings 53 of second rotor 30 in the exemplary embodiment described above constitute a double bearing forming a pair, and as illustrated in FIG. 22, the two bearings are disposed outside bottomed cylinder 31a of second rotary shaft 31 (that is, a cantilever structure with a double bearing is employed), but the present disclosure is not limited to this configuration. For example, as in second rotor 30D illustrated in FIG. 23, one of a pair of third bearings 53, which is a double bearing, may be disposed outside bottomed cylinder 31a of second rotary shaft 31 and the other one of a pair of third bearings 53 may be disposed on the open side of frame 200 of pole piece assembly 32D.

In this case, as illustrated in FIG. 23, it may be configured that one end of mold resin 300D of pole piece assembly 32D protrudes further than one end of circumferential portion 210 of frame 200 or one end of pole piece 100, and the other one of a pair of third bearings 53 is attached to one end of protruding mold resin 300D. Specifically, in FIG. 23, recess 301 for housing third bearing 53 is formed in a portion on the radially inner side of one end of protruding mold resin 300D, and the other one of a pair of third bearings 53 is disposed in recess 301. Recess 301 may be formed when molding mold resin 300D, or may be formed by cutting by machining or the like after mold resin 300D has been molded.

Fifth Exemplary Modification

Figure 24:
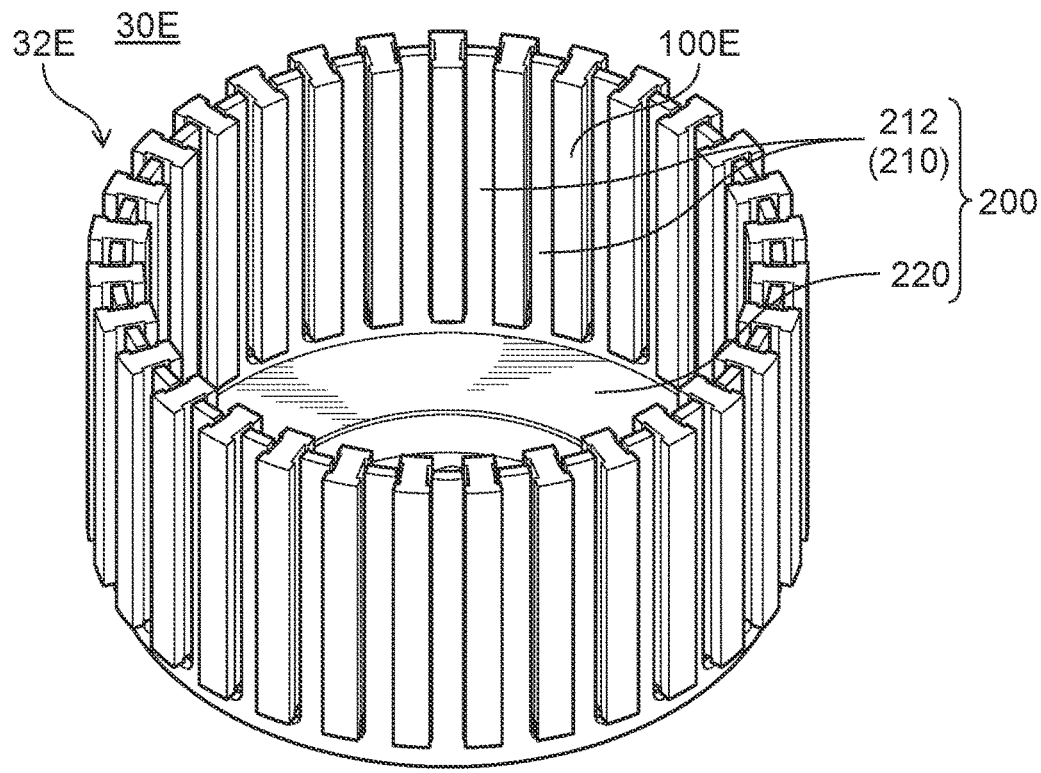
FIG. 24 is a view illustrating a relationship between pole pieces and a frame of a second rotor according to a fifth exemplary modification.

Second rotor 30E according to a fifth exemplary modification will be described. FIG. 24 is a view illustrating a relationship between pole pieces 100E and frame 200 of second rotor 30E according to a fifth exemplary modification.

In second rotor 30 of the exemplary embodiment described above, as illustrated in FIG. 13, the longitudinal length of pole piece 100 is shorter than the longitudinal length of extension part 212 of frame 200 (the slit length of gap 211), and one end of pole piece 100 dents from the open end of frame 200, but the present invention is not limited to this configuration. For example, it may be configured that, as in pole piece assembly 32E of second rotor 30E illustrated in FIG. 24, the longitudinal length of pole piece 100E is the same as the longitudinal length of extension part 212 of frame 200 (the slit length of gap 211), and one end of pole piece 100E and the open end of frame 200 are flush with each other. Mold resin 300 is omitted in FIG. 24.

Sixth Exemplary Modification

Figure 25:
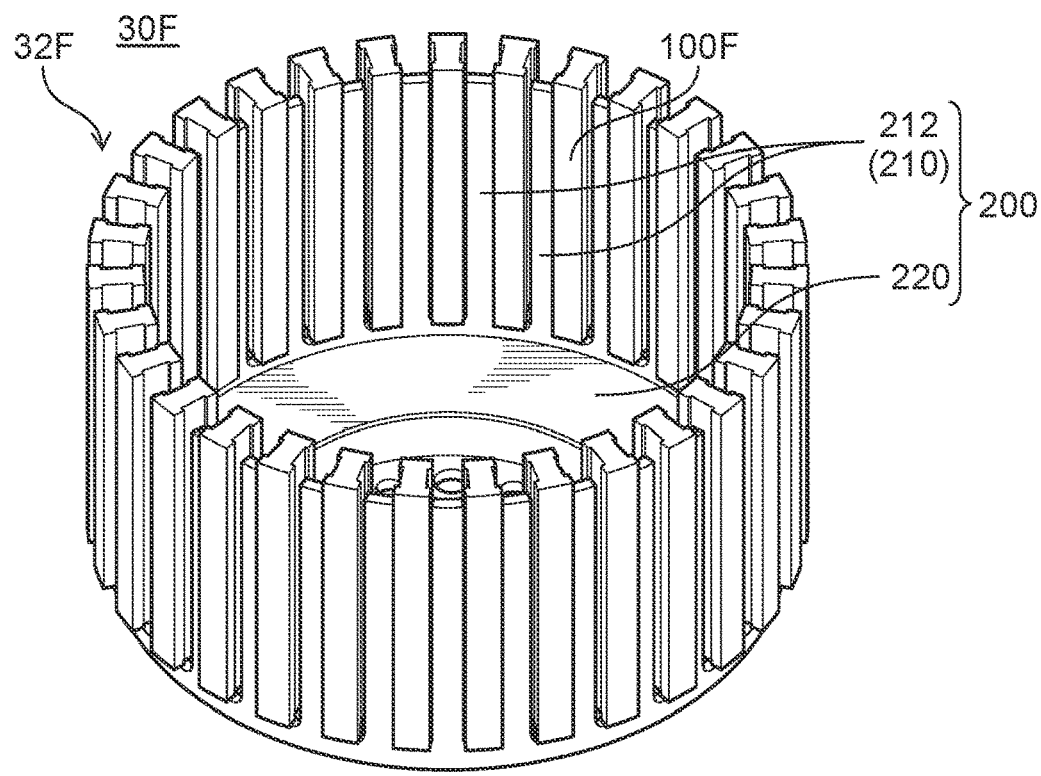
FIG. 25 is a view illustrating a relationship between pole pieces and a frame of a second rotor according to a sixth exemplary modification.

Second rotor 30F according to a sixth exemplary modification will be described. FIG. 25 is a view illustrating a relationship between pole pieces 100F and frame 200 of second rotor 30F according to the sixth exemplary modification.

In second rotor 30 of the exemplary embodiment described above, it may be configured that, like pole pieces assembly 32F of second rotor 30F illustrated in FIG. 25, the longitudinal length of pole piece 100F is longer than the longitudinal length of extension part 212 of frame 200 (the slit length of gap 211), and one end of pole piece 100F extends beyond the open end of frame 200. Mold resin 300 is omitted in FIG. 25.

Seventh Exemplary Modification

Figure 26:
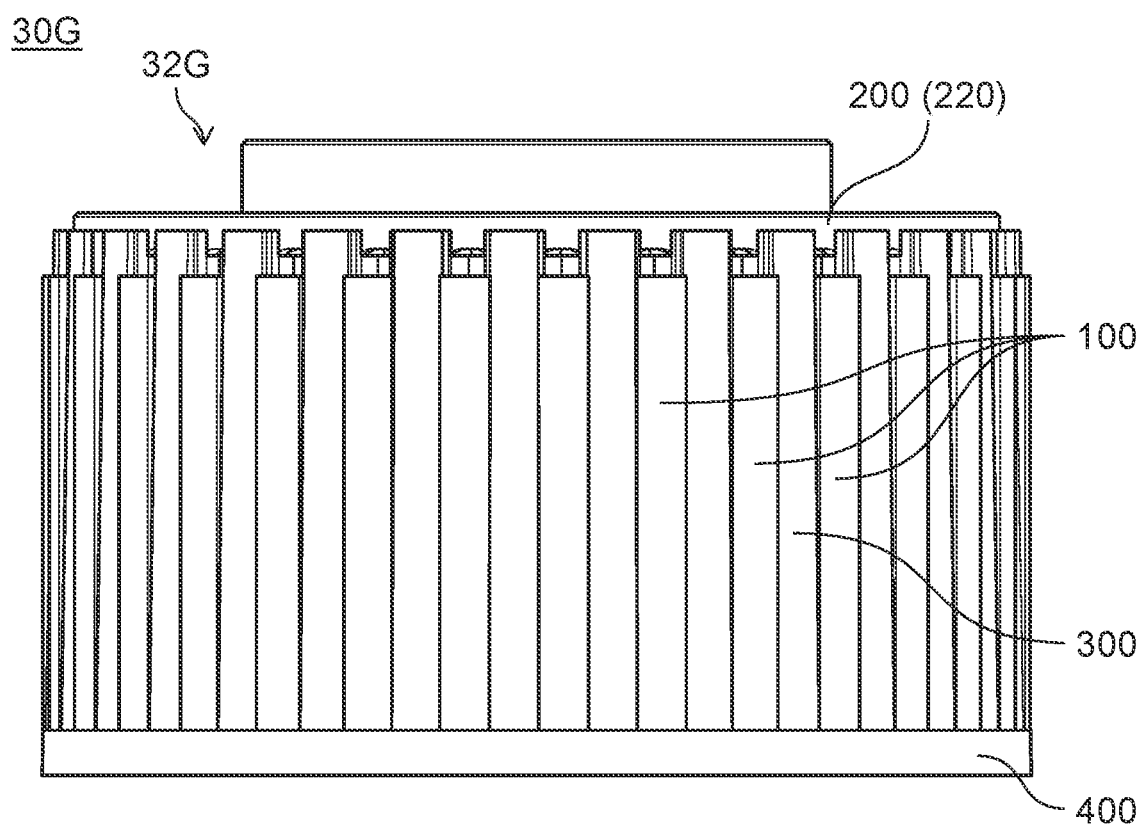
FIG. 26 is a side view illustrating a configuration of a second rotor according to a seventh exemplary modification.

Second rotor 30G according to a seventh exemplary modification will be described. FIG. 26 is a view illustrating a relationship between pole pieces 100 and frame 200 of second rotor 30G according to the seventh exemplary modification.

As in pole piece assembly 32G of second rotor 30G illustrated in FIG. 26, retainer 400 for preventing pole pieces 100 from coming off may be provided at an end on the opened side of frame 200. In FIG. 26, retainer 400 is prepared separately from other parts such as frame 200 of pole piece assembly 32G, but the present disclosure is not limited to this configuration. For example, retainer 400 may not be a separate part, but be part of mold resin 300 and formed integrally with mold resin 300. Furthermore, retainer 400 may not be a part constituting pole piece assembly 32G but constitute part of a mold used for resin-molding pole pieces 100 and frame 200.

Exemplary Modification of Pole Piece

Figure 27A:
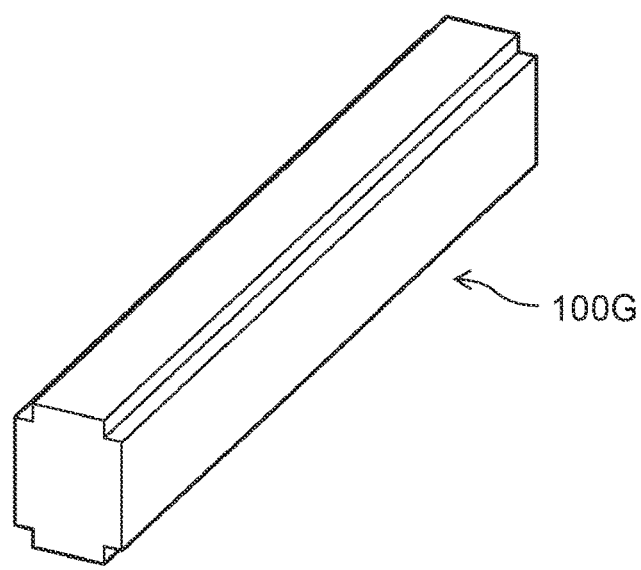
FIG. 27A is a view illustrating a first exemplary modification of a pole piece.
Figure 27B:
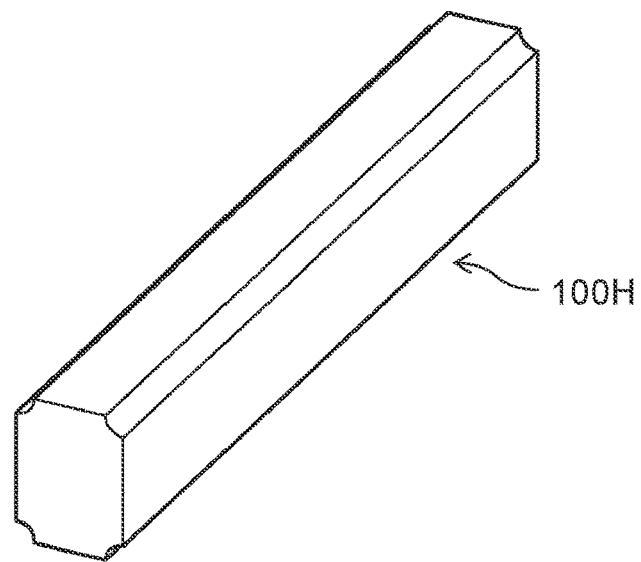
FIG. 27B is a perspective view illustrating a second exemplary modification of a pole piece.
Figure 27C:
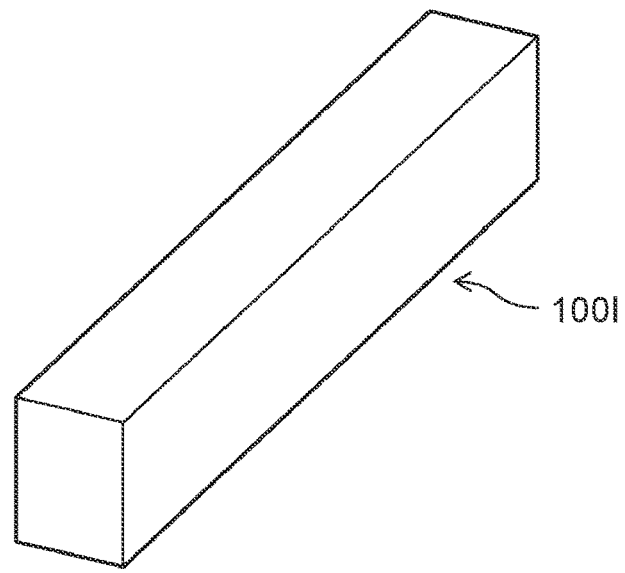
FIG. 27C is a perspective view illustrating a third exemplary modification of a pole piece.
Figure 27D:
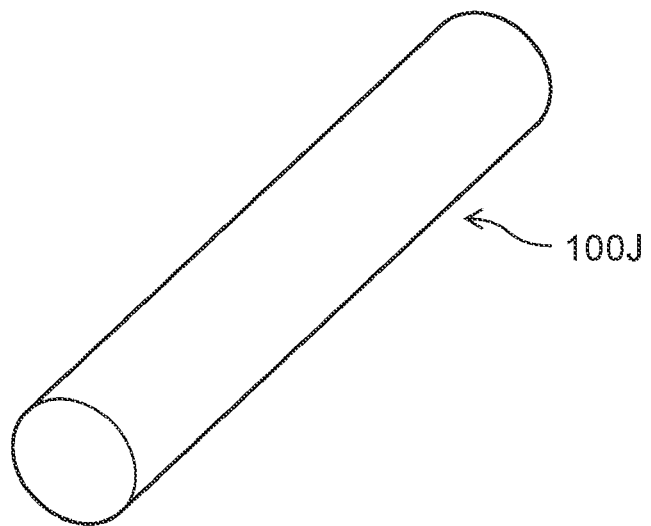
FIG. 27D is a perspective view illustrating a fourth exemplary modification of a pole piece.
Figure 27E:
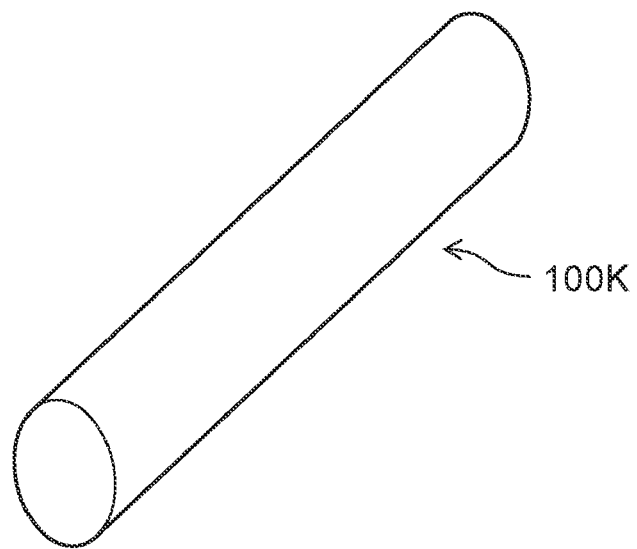
FIG. 27E is a perspective view illustrating a fifth exemplary modification of a pole piece.
Figure 28:
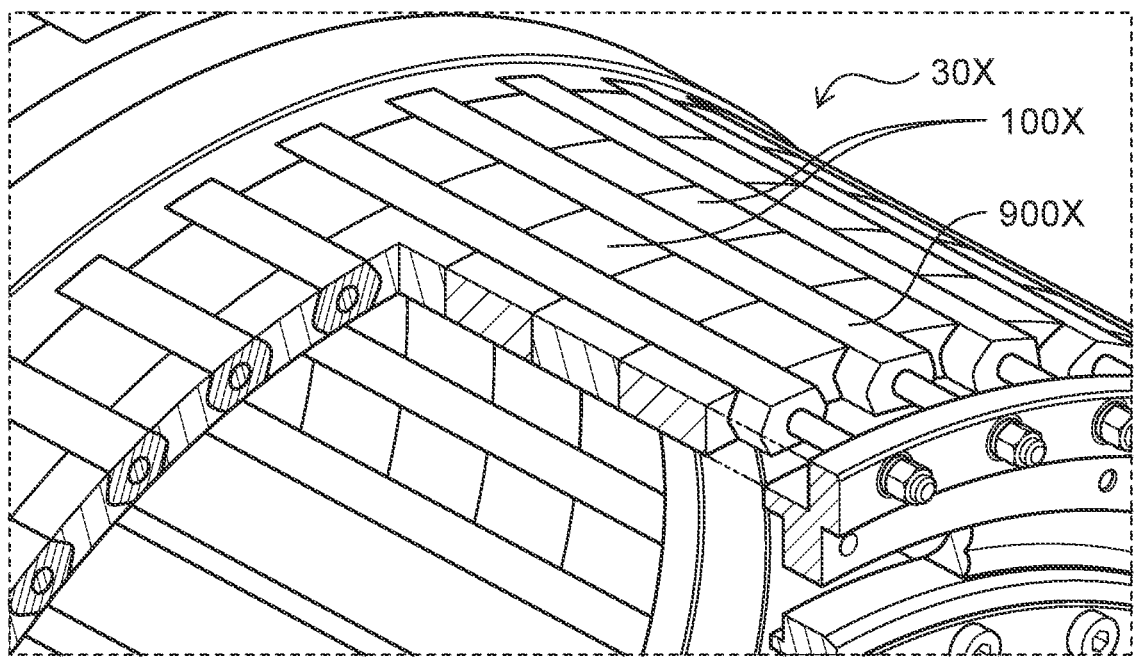
FIG. 28 is a perspective view illustrating a conventional magnetic geared motor with a low-speed rotor partially cut away.

An exemplary modification of pole piece 100 will be described with reference to FIGS. 27A to 27E. FIG. 27A is a perspective view illustrating pole piece 100G of a first exemplary modification. FIG. 27B is a perspective view illustrating pole piece 100H of a second exemplary modification. FIG. 27C is a perspective view illustrating pole piece 100I of a third exemplary modification. FIG. 27D is a perspective view illustrating pole piece 100J of a fourth exemplary modification. FIG. 27E is a perspective view illustrating pole piece 100K of a fifth exemplary modification.

In the exemplary embodiment described above, pole piece 100 has an I-shaped cross-section taken in a plane normal to the longitudinal direction of pole piece, but the shape of the cross-section is not limited to an I-shape. For example, as illustrated in FIGS. 27A to 27E, pole pieces may take various shapes. Specifically, as illustrated in the first exemplary modification in FIG. 27A, pole piece 100G having a cross-sectional shape that is a quadrangular shape with four corners thereof cut away each by a square shape (that is, to have L-shaped edges) may be used. Alternatively, as illustrated in the second exemplary modification in FIG. 27B, pole piece 100H having a cross-sectional shape that is a quadrangular shape with four corners thereof cut away each by a circular sector shape (that is, to have arc edges) may be used. Alternatively, as illustrated in the third exemplary modification in FIG. 27C, pole piece 100I having a polygonal cross-sectional shape such as a quadrangular shape may be used. Alternatively, as illustrated in the fourth exemplary modification in FIG. 27D, pole piece 100J having a circular cross-sectional shape may be used. Alternatively, as illustrated in the fifth exemplary modification in FIG. 27E, pole piece 100K having an elliptic cross-sectional shape may be used. That is, pole piece having any cross-sectional shape having an outer profile surrounded by a plurality of straight lines and/or arcs may be employed.

As in the exemplary embodiments described above, forming the pole piece to have an I-shaped cross-section, into a shape with four corners cut away as illustrated in the first exemplary modification in FIG. 27A and the second exemplary modification in FIG. 27B, or alternatively, providing a recess, a notch, or the like partly on the outer surface of the pole piece facilitates the pole piece to bite on mold resin 300. Accordingly, a further reliable second rotor and a magnetic geared motor can be provided.

Other Exemplary Modification

In the exemplary embodiments described above, first rotor 20 is an SPM rotor, but first rotor 20 is not limited thereto. For example, first rotor 20 may be a permanent magnet rotor and may be an interior permanent magnet (IPM) rotor in which a permanent magnet is embedded in a rotor core. In this case, the rotor may be configured to have a permanent magnet made of a sintered magnet inserted into an insertion hole (embedded hole) provided in a rotor core, or may be configured to have a bonded magnet embedded in an embedded hole provided in a rotor core.

In the exemplary embodiments described above, stator 10, second rotor 30, and first rotor 20 are disposed in this order from the radially outer side toward the radially inner side, but the present disclosure is not limited to this configuration.

In the exemplary embodiments described above, a concentrated winding coil is used as coil 12 of stator 10, but is not limited thereto. For example, a distributed winding coil may be used as coil 12.

In the exemplary embodiments described above, an integrally molded part in which a plurality of pole pieces and a frame are integrally formed with a mold resin is adopted as a rotor, but the present disclosure is not limited to this configuration. For example, an integrally molded part in which a plurality of pole pieces and a frame are integrally formed with a mold resin may be adopted as a stator. In this case, the stator which is an integrally molded part has the same configuration as second rotor 30.

In the present disclosure, a case in which a magnetic gear and a motor are integrated is adopted as a magnetic geared motor, but the present disclosure is not limited to this configuration. For example, the present disclosure may be adopted solely as a magnetic gear independent of a motor. In this case, the magnetic gear includes a rotor having the same configuration as second rotor 30 or a rotor.

The present disclosure also includes embodiments resulting from various changes made to the exemplary embodiments described above by those skilled in the art, as well as embodiments made by any combination of component elements and functions of the exemplary embodiments described above without departing from the spirit of the present disclosure.

INDUSTRIAL APPLICABILITY

The present disclosure can be used for various electric devices including AVGs.

REFERENCE MARKS IN THE DRAWINGS

1: magnetic geared motor
2: mold
10: stator
11: stator core
11*a*: teeth
11*b*: yoke
11*c*: magnetic pole portion
11*d*: recess
11*e*: slot opening
12: coil
13: permanent magnet
20: first rotor
21: first rotary shaft
21*a*: first end
21*b*: second end
22: permanent magnet
23: rotor core
30A, 30B, 30C, 30D, 30E, 30F, 30G: second rotor
31: second rotary shaft
31*a*: bottomed cylinder
31*b*: rod
32, 32D, 32E, 32F, 32G: pole piece assembly
33: screw
40: housing
41: sleeve
42: first bracket
42*a*: first bearing holder
43: second bracket
43*a*: third bearing holder
51: first bearing
52: second bearing
53: third bearing
100, 100A, 100C, 100E, 100F, 100G, 100H, 100I, 100J, 100K: pole piece
110: first section
120: second section
130: third section
140: projection
200, 200A, 200B, 200C: frame
210, 210B, 210C: circumferential portion
211: gap
211C: through-hole
212, 212A: extension part
213: open hole
220: bottom
300, 300D: mold resin
300L: liquid resin
301: recess
400: retainer

The invention claimed is:

1. A magnetic geared motor comprising:
a stator;
a first rotor including a first rotary shaft and configured to rotate about an axis of the first rotary shaft by magnetic flux generated by the stator; and
a second rotor including a second rotary shaft coaxial with the first rotary shaft and configured to rotate about an axis of the second rotary shaft at an angular velocity different from an angular velocity of the first rotor by the magnetic flux generated by the stator, wherein:
the second rotor includes a plurality of pole pieces, a frame, and a mold resin,
the plurality of pole pieces are annularly arranged along a circumferential direction of the second rotor,
the frame includes a circumferential portion including a plurality of gaps,
each of the plurality of gaps is arranged corresponding to a different one of the plurality of pole pieces,
each of the plurality of pole pieces is disposed at least partly in a corresponding one of the plurality of gaps, and
the plurality of pole pieces and the frame are fixed with each other by the mold resin such that the mold resin covers the frame with the plurality of pole pieces partly inserted into the plurality of gaps of the frame, respectively.

2. The magnetic geared motor according to claim 1, wherein the mold resin covers the frame to cause at least one of radially inner side surfaces and radially outer side surfaces of the plurality of pole pieces to be exposed.

3. The magnetic geared motor according to claim 1, wherein
the frame further includes a bottom having a surface intersecting the second rotary shaft, and
the circumferential portion is provided upright on an outer circumferential edge of the bottom.

4. The magnetic geared motor according to claim 3, wherein
the circumferential portion includes a plurality of extension parts each extending in a direction away from the bottom,
the mold resin covers the circumferential portion of the frame with a corresponding one of the plurality of pole pieces disposed between two adjacent extension parts of the plurality of extension parts,
the plurality of gaps is a plurality of slits extending in the direction away from the bottom,
each of the plurality of slits is between two adjacent extension parts among the plurality of extension parts, and
each of the plurality of pole pieces has a shape extending along a longitudinal direction of each of the plurality of slits and is disposed between the two adjacent extension parts.

5. The magnetic geared motor according to claim 4, wherein each of the plurality of slits is closed at a side opposite to the bottom.

6. The magnetic geared motor according to claim 4, wherein
each of the plurality of pole pieces includes
a first section positioned between the two adjacent extension parts,
a second section positioned further on a radially outer side of the second rotor than the first section, and
a third section positioned further on a radially inner side of the second rotor than the first section, and
two ends, regarding the circumferential direction of the second rotor, of each of the second section and the third section protrude further than the first section in the circumferential direction of the second rotor.

7. The magnetic geared motor according to claim 6, wherein leading ends of the two ends of each of the second section and the third section overlap the extension part along a radial direction of the second rotor.

8. The magnetic geared motor according to claim 6, wherein in a cross-section taken in a plane orthogonal to an axis of rotation of the second rotor, an inner surface of the second section, a side surface of the first section, and an outer surface of the third section are in contact with the mold resin.

9. The magnetic geared motor according to claim 4, wherein at least one of the plurality of extension parts includes an open hole.

10. The magnetic geared motor according to claim 1, wherein
each of the plurality of gaps is a row of a plurality of open holes arranged along a direction parallel to the axis of rotation of the second rotor, a plurality of the rows of the open holes being provided in the circumferential portion over an entire circumferential direction of the circumferential portion, and
each of the plurality of pole pieces includes a plurality of projections inserted into a respective one of the plurality of open holes.

11. The magnetic geared motor according to claim 10, wherein
each of the plurality of pole pieces is disposed on a radially outer side of the circumferential portion, and
the plurality of projections protrudes toward a radially inner side of the circumferential portion.

12. The magnetic geared motor according to claim 10, wherein
each of the plurality of pole pieces is disposed on the radially inner side of the circumferential portion, and
the plurality of projections protrudes toward the radially outer side of the circumferential portion.

13. The magnetic geared motor according to claim 1, wherein each of the plurality of pole pieces is a stacked body in which a plurality of steel sheets is stacked.

14. The magnetic geared motor according to claim 13, wherein a stacking direction of the plurality of steel sheets is along the axis of rotation of the second rotor.

15. The magnetic geared motor according to claim 1, wherein
one end of the mold resin protrudes further than one end of the circumferential portion, and
a bearing is attached to the one end of the mold resin.

16. The magnetic geared motor according to claim 15, wherein a recess for housing the bearing is provided on a radially inner side of the one end of the mold resin.

17. A magnetic geared motor comprising:
a stator;
a first rotor including a first rotary shaft and configured to rotate with the first rotary shaft about an axis of the first rotary shaft by magnetic flux generated by the stator; and
a second rotor including a second rotary shaft coaxial with the first rotary shaft and configured to rotate with the second rotary shaft about an axis of the second rotary shaft at an angular velocity different from an angular velocity of the first rotor, wherein:
the stator includes a plurality of pole pieces, a frame, and a mold resin,
the plurality of pole pieces is annularly arranged along a circumferential direction of the stator,
the frame includes a circumferential portion including a plurality of gaps,
the plurality of gaps is arranged corresponding to the plurality of pole pieces,
each of the plurality of pole pieces is disposed at least partly in a corresponding one of the plurality of gaps, and
the plurality of pole pieces and the frame are integrally formed with the mold resin such that the mold resin covers the frame with the plurality of pole pieces partly inserted into the plurality of gaps of the frame, respectively.

18. A magnetic gear comprising a rotor, wherein;
the rotor includes a plurality of pole pieces, a frame, and a mold resin,
the plurality of pole pieces is annularly arranged along a circumferential direction of the rotor,
the frame includes a circumferential portion including a plurality of gaps,
the plurality of gaps is arranged corresponding to the plurality of pole pieces,
each of the plurality of pole pieces is disposed at least partly in a corresponding one of the plurality of gaps, and
the plurality of pole pieces and the frame are fixed with each other by the mold resin such that the mold resin covers the frame with the plurality of pole pieces partly inserted into the plurality of gaps of the frame, respectively.

19. A magnetic gear comprising a stator, wherein:
the stator includes a plurality of pole pieces, a frame, and a mold resin,
the plurality of pole pieces is annularly arranged along a circumferential direction of the stator,
the frame includes a circumferential portion including a plurality of gaps,
the plurality of gaps is arranged corresponding to the plurality of pole pieces,
each of the plurality of pole pieces is disposed at least partly in a corresponding one of the plurality of gaps, and
the plurality of pole pieces and the frame are integrally formed with the mold resin such that the mold resin covers the frame with the plurality of pole pieces partly inserted into the plurality of gaps of the frame, respectively.

20. The magnetic geared motor according to claim 1, wherein the frame is made of a metal material.

\* \* \* \* \*